US012624279B2

(12) United States Patent
Chikushi et al.

(10) Patent No.: US 12,624,279 B2
(45) Date of Patent: May 12, 2026

(54) QUANTUM DOT-CONTAINING POLYMERIZABLE COMPOSITION, CURED PRODUCT, WAVELENGTH CONVERSION MEMBER, BACKLIGHT UNIT, AND LIQUID CRYSTAL DISPLAY DEVICE

(71) Applicant: FUJIFILM Corporation, Tokyo (JP)

(72) Inventors: Natsuru Chikushi, Kanagawa (JP); Tatsuya Oba, Kanagawa (JP); Hirofumi Toyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 654 days.

(21) Appl. No.: 18/050,368

(22) Filed: Oct. 27, 2022

(65) Prior Publication Data

US 2023/0088475 A1 Mar. 23, 2023

Related U.S. Application Data

(63) Continuation of application No. PCT/JP2021/016874, filed on Apr. 28, 2021.

(30) Foreign Application Priority Data

Apr. 28, 2020 (JP) ................................ 2020-079834

(51) Int. Cl.

| | |
|---|---|
| ***C09K 11/02*** | (2006.01) |
| ***C08G 75/045*** | (2016.01) |
| ***C08K 5/13*** | (2006.01) |
| ***C08K 9/02*** | (2006.01) |
| ***C09K 11/08*** | (2006.01) |
| ***C09K 11/70*** | (2006.01) |
| ***G02F 1/1335*** | (2006.01) |

(52) U.S. Cl.

CPC ............ *C09K 11/02* (2013.01); *C08G 75/045* (2013.01); *C08K 5/13* (2013.01); *C08K 9/02* (2013.01); *C09K 11/0883* (2013.01); *C09K 11/703* (2013.01); *G02F 1/133614* (2021.01)

(58) Field of Classification Search

None

See application file for complete search history.

(56) References Cited

U.S. PATENT DOCUMENTS

| | | | |
|---|---|---|---|
| 2012/0001217 A1 | 1/2012 | Kang et al. | |
| 2019/0040175 A1 | 2/2019 | Onishi et al. | |
| 2021/0040383 A1 | 2/2021 | Yahata et al. | |

(Continued)

FOREIGN PATENT DOCUMENTS

| | | |
|---|---|---|
| JP | 2011-213821 A | 10/2011 |
| JP | 5801886 B2 | 10/2015 |
| JP | 2017-078120 A | 4/2017 |

(Continued)

OTHER PUBLICATIONS

International Search Report issued in PCT/JP2021/016874 on Jun. 15, 2021.

(Continued)

*Primary Examiner* — Eli D. Strah

(74) *Attorney, Agent, or Firm* — Edwards Neils LLC; Jean C. Edwards, Esq.

(57) ABSTRACT

Provided is a polymerizable composition including a quantum dot, a polyfunctional thiol, a polyfunctional (meth) acrylate, and a phenolic compound.

15 Claims, 11 Drawing Sheets

(56) References Cited

U.S. PATENT DOCUMENTS

2021/0206922 A1 7/2021 Onishi

FOREIGN PATENT DOCUMENTS

| | | | |
|---|---|---|---|
| JP | 2017-137451 | A | 8/2017 |
| WO | WO-2017068781 | A1 * | 4/2017 |
| WO | 2017/154428 | A1 | 9/2017 |
| WO | 2019/189495 | A1 | 10/2019 |
| WO | 2019/225377 | A1 | 11/2019 |

OTHER PUBLICATIONS

Written Opinion issued in PCT/JP2021/016874 on Jun. 15, 2021.

International Preliminary Report on Patentability completed by WIPO on Oct. 27, 2022 in connection with International Patent Application No. PCT/JP2021/016874.

Office Action, which was issued by the Japanese Patent Office on Jun. 6, 2023, in connection with Japanese Patent Application No. 2022-518102.

* cited by examiner

QUANTUM DOT-CONTAINING POLYMERIZABLE COMPOSITION, CURED PRODUCT, WAVELENGTH CONVERSION MEMBER, BACKLIGHT UNIT, AND LIQUID CRYSTAL DISPLAY DEVICE

CROSS-REFERENCE TO RELATED APPLICATIONS

This application is a Continuation of PCT International Application No. PCT/JP2021/016874 filed on Apr. 28, 2021, which was published under PCT Article 21(2) in Japanese, and which claims priority under 35 U.S.C. § 119(a) to Japanese Patent Application No. 2020-079834 filed on Apr. 28, 2020. The above applications are hereby expressly incorporated by reference, in their entirety, into the present application.

BACKGROUND OF THE INVENTION

1. Field of the Invention

The present invention relates to a quantum dot-containing polymerizable composition, a cured product, a wavelength conversion member, a backlight unit, and a liquid crystal display device.

2. Description of the Related Art

A flat panel display such as a liquid crystal display device (hereinafter, also referred to as LCD) is used as a space-saving image display apparatus with low power consumption, and its application is expanding year by year. The liquid crystal display device is usually composed of at least a backlight unit and a liquid crystal cell.

In recent years, a quantum dot (also referred to as QD) has been attracting attention as a light emitting material for flat panel displays (see, for example, paragraph [0002] of JP5801886B).

SUMMARY OF THE INVENTION

The backlight unit can include a member containing at least quantum dots and a light source. Such a member is generally called a wavelength conversion member. For example, in a case where light is incident on a wavelength conversion member from a light source, quantum dots are excited by the incident light to emit fluorescence. Here, in a case of using quantum dots having different light-emitting properties, the fluorescence emitted by the quantum dots and/or each bright line light of red light, green light, and blue light as the light emitted from the light source and passed through the wavelength conversion member can be emitted from the wavelength conversion member. This makes it possible to realize white light. Since the fluorescence emitted by the quantum dots has a small half-width, the obtained white light has high brightness and excellent color reproducibility. With the progress of the three-wavelength light source technology using such quantum dots, the color reproduction range has been expanded from 72% to 100% compared to the current TV standards (Full High Definition (FHD), National Television System Committee (NTSC)).

A member containing such quantum dots is desired to be capable of emitting light with higher brightness.

The member can have a layer (generally referred to as a "wavelength conversion layer") containing a cured product obtained by curing a polymerizable composition containing quantum dots. The polymerizable composition used for producing such a cured product is desired to have little change in viscosity over time, that is, to have excellent liquid stability.

In view of the above, an object of one aspect of the present invention is to provide a quantum dot-containing polymerizable composition which can contribute to an improvement in brightness of a wavelength conversion member containing quantum dots and has excellent liquid stability.

One aspect of the present invention relates to a polymerizable composition comprising a quantum dot, a polyfunctional thiol, a polyfunctional (meth)acrylate, and a phenolic compound.

In one form, the number of hydroxy groups contained in one molecule of the phenolic compound can be in a range of 1 to 3.

In one form, the number of hydroxy groups contained in one molecule of the phenolic compound can be 2 or 3.

In one form, the number of hydroxy groups contained in one molecule of the phenolic compound can be 3.

In one form, the polymerizable composition can contain pyrogallol as the phenolic compound.

In one form, in the polymerizable composition, a content of pyrogallol with respect to a total amount of the composition can be 0.001% by mass or more and 0.500% by mass or less.

In one form, in the polymerizable composition, a content of pyrogallol with respect to a total amount of the composition can be 0.005% by mass or more and 0.300% by mass or less.

In one form, in the polymerizable composition, a content of pyrogallol with respect to a total amount of the composition can be 0.010% by mass or more and 0.100% by mass or less.

One aspect of the present invention relates to a cured product obtained by curing the above-mentioned polymerizable composition.

One aspect of the present invention relates to a wavelength conversion member comprising the cured product.

One aspect of the present invention relates to a backlight unit comprising the wavelength conversion member and a light source.

One aspect of the present invention relates to a liquid crystal display device comprising the backlight unit and a liquid crystal cell.

According to one aspect of the present invention, it is possible to provide a polymerizable composition containing quantum dots, which enables the production of a wavelength conversion member capable of emitting light with high brightness and has excellent liquid stability. In addition, according to one aspect of the present invention, it is possible to provide a cured product obtained by curing such a polymerizable composition, a wavelength conversion member containing the cured product, a backlight unit including the wavelength conversion member, and a liquid crystal display device including the backlight unit.

DESCRIPTION OF THE PREFERRED EMBODIMENTS

Figure 1:
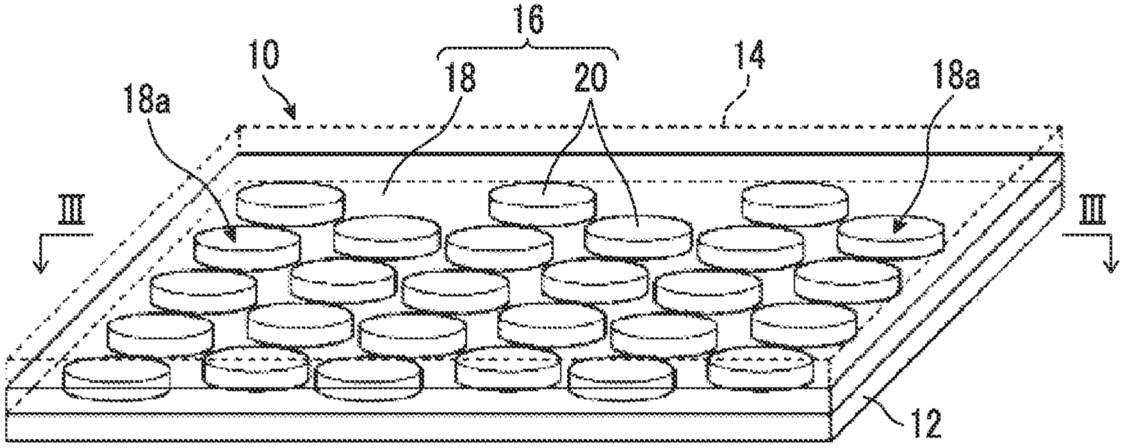
FIG. 1 is a perspective view conceptually showing an example of a wavelength conversion member.

The following description may be based on representative embodiments of the present invention. However, the present invention is not limited to such embodiments. In the present invention and the present specification, any numerical range expressed using "to" refers to a range including the numerical values before and after the "to" as a lower limit value and an upper limit value, respectively.

In the present invention and the present specification, the term "half-width" of a peak refers to a width of the peak at a peak height of ½. In addition, light having a light emission center wavelength in a wavelength range of 400 nm or longer and shorter than 500 nm is called blue light, light having a light emission center wavelength in a wavelength range of 500 nm or longer and shorter than 600 nm is called green light, and light having a light emission center wavelength in a wavelength range of 600 nm or longer and 680 nm or shorter is called red light.

[Polymerizable Composition]

One aspect of the present invention relates to a polymerizable composition containing a quantum dot, a polyfunctional thiol, a polyfunctional (meth)acrylate, and a phenolic compound.

In the present invention and the present specification, the term "(meth)acrylate" refers to a compound containing one or more (meth)acryloyl groups in one molecule, and the term "(meth)acryloyl group" shall be used to refer to either or both of an acryloyl group and a methacryloyl group. The functionality in "(meth)acrylate" refers to the number of (meth)acryloyl groups contained in one (meth)acrylate molecule. With regard to (meth)acrylate, the term "monofunctional" refers to that the number of (meth)acryloyl groups contained in one molecule is one, and the term "polyfunctional" refers to that the number of (meth)acryloyl groups contained in one molecule is two or more. In addition, the (meth)acryloyl group can be included in the (meth)acrylate in the form of a (meth)acryloyloxy group. The term "(meth) acryloyloxy group" shall be used to refer to either or both of an acryloyloxy group and a methacryloyloxy group.

In the present invention and the present specification, with regard to (meth)acrylate, a (meth)acrylate that can correspond to both the first (meth)acrylate and the second (meth) acrylate which will be described later shall be interpreted as the second (meth)acrylate.

In the present invention and the present specification, the "polymerizable composition" is a composition containing at least one polymerizable compound, and has a property of being cured by being subjected to a polymerization treatment such as light irradiation or heating. In addition, the "polymerizable compound" is a compound containing one or more polymerizable functional groups in one molecule. The "polymerizable functional group" is a group that can participate in a polymerization reaction, and the "(meth) acryloyl group" is a polymerizable functional group.

In the present invention and the present specification, the "polyfunctional thiol" is a compound having two or more thiol groups in one molecule. The functionality in thiol refers to the number of thiol groups contained in one thiol molecule.

As a result of extensive studies, the present inventors have newly found that a wavelength conversion member containing a cured product obtained by curing the polymerizable composition according to one aspect of the present invention can emit light with high brightness and that the above-described polymerizable composition has excellent liquid stability. The reason for this is inferred by the present inventors as follows.

It is said that coordinating a ligand on the surface of a quantum dot contributes to an improvement in brightness. In this regard, it is considered that a compound having a thiol group can function as a ligand for a quantum dot by adsorption of the thiol group on the surface of the quantum dot. In addition, since the polyfunctional thiol is contained in the polymerizable compound together with the (meth) acrylate, it is presumed that a part of the thiol groups contained in the polyfunctional thiol can undergo a cross-linking reaction with the (meth)acryloyl group of the (meth) acrylate, which can contribute to suppressing a decrease in brightness, that is, improving the durability.

However, in a composition containing both a compound containing a thiol group and a compound containing a (meth)acryloyl group, an increase in viscosity with time tends to occur as the thiol-ene reaction proceeds. On the other hand, as a result of studies by the present inventors, it has been newly found that, in a case of adding a phenolic compound to such a composition, the phenolic compound can act as a polymerization inhibitor, so that the above-mentioned increase in viscosity can be suppressed and that the wavelength conversion member containing a cured product obtained by curing the above-mentioned composition can emit light with high brightness (that is, the brightness can be further improved). Regarding the improvement in brightness, although it is only speculation, the present inventors consider that the phenolic compound may be adsorbed on the surface of the quantum dot, which may contribute to the improvement in brightness. However, this is merely speculation and does not limit the present invention. On the other hand, as a result of studies by the present inventors, it has been difficult to improve the liquid stability and/or the brightness by using a compound generally said to function as a polymerization inhibitor. As an example, in a polymerization inhibitor generally referred to as a stable radical (for example, 2,2,6,6-tetramethylpiperidine 1-oxyl used in Comparative Examples which will be described later), it is considered that the stable radical withdraws hydrogen from a thiol group to generate a thiyl radical, and thus the reaction between the thiol group and the (meth)acryloyl group proceeds slowly, which is presumed to makes it difficult to improve the liquid stability.

However, the present invention is not limited to the conjectures of the present inventors including the foregoing inferences.

Hereinafter, the polymerizable composition will be described in more detail.

<Polyfunctional Thiol>

The polyfunctional thiol contained in the polymerizable composition is a di- or higher functional thiol, and preferably a tri- or higher functional thiol. The polyfunctional thiol can be, for example, an octafunctional or lower functional thiol, a heptafunctional or lower functional thiol, a hexafunctional or lower functional thiol, a pentafunctional or lower functional thiol, or a tetrafunctional or lower functional thiol. From the viewpoint of further improving the durability of the wavelength conversion member containing the cured product obtained by curing the polymerizable composition, the polyfunctional thiol is preferably one or two or more selected from the group consisting of difunctional to hexafunctional polyfunctional thiols, more preferably one or two or more selected from the group consisting of difunctional to tetrafunctional polyfunctional thiols, still more preferably one or two or more selected from the group consisting of trifunctional or tetrafunctional polyfunctional thiols, and even still more preferably a trifunctional thiol.

Specific examples of the polyfunctional thiol include ethylene bis(thioglycolate), diethylene glycol bis(3-mercaptopropionate), tetraethylene glycol bis(3-mercaptopropionate), 1,2-propylene glycol bis(3-mercaptopropionate), diethylene glycol bis(3-mercaptobutyrate), 1,4-butanediol bis(3-mercaptopropionate), 1,4-butanediol bis(3-mercaptobutyrate), 1,8-octanediol bis(3-mercaptopropionate), 1,8-octanediol bis(3-mercaptobutyrate), hexanediol bisthioglycolate, trimethylolpropane tris(3-mercaptopropionate), trimethylolpropane tris(3-mercaptobutyrate), trimethylolpropane tris(3-mercaptoisobutyrate), trimethylolpropane tris (2-mercaptoisobutyrate), trimethylolpropane tristhioglycolate, trimethylolpropane tris(3-mercaptopropionate), tris-[(3-mercaptopropionyloxy)-ethyl]-isocyanurate, trimethylolethane tris(3-mercaptobutyrate), pentaerythritol tetrakis(3-mercaptopropionate), pentaerythritol tetrakis(3-mercaptobutyrate), pentaerythritol tetrakis(3-mercaptoisobutyrate), pentaerythritol tetrakis(2-mercaptoisobutyrate), dipentaerythritol hexakis(3-mercaptopropionate), dipentaerythritol hexakis(2-mercaptopropionate), dipentaerythritol hexakis(3-mercaptobutyrate), dipentaerythritol hexakis(3-mercaptoisobutyrate), dipentaerythritol hexakis (2-mercaptoisobutyrate), pentaerythritol tetrakisthioglycolate, dipentaerythritol hexakisthioglycolate, and dipentaerythritol hexakis(3-mercaptopropionate). As the polyfunctional thiol, a commercially available product can be used, and a polyfunctional thiol synthesized by a known method can also be used. Examples of the commercially available product include commercially available polyfunctional thiols described in Examples which will be described later, such as Multhiol Y3 (trade name, manufactured by SC Organic Chemical Co., Ltd.).

The molecular weight of the polyfunctional thiol contained in the polymerizable composition can be, for example, 200 or more. From the viewpoint of further improving the durability, the molecular weight of the polyfunctional thiol is preferably 300 or more. In addition, from the viewpoint of further improving the brightness, the molecular weight of the polyfunctional thiol is preferably 1000 or less and more preferably 500 or less. With regard to the molecular weight, the molecular weight of the second (meth)acrylate is preferably equal to or less than the molecular weight of the polyfunctional thiol and more preferably less than the molecular weight of the polyfunctional thiol. This point will be further described later.

In the present invention and the present specification, the molecular weight is intended to refer to a weight-average molecular weight for a polymer (the polymer also includes an oligomer). The weight-average molecular weight is intended to refer to a weight-average molecular weight in terms of polystyrene, for the measured value measured by gel permeation chromatography (GPC). For example, the following conditions can be adopted as the measurement conditions for GPC.

GPC device: HLC-8120 (manufactured by Tosoh Corporation)

Column: TSK gel Multipore HXL-M (manufactured by Tosoh Corporation, 7.8 mm ID (Inner Diameter)×30.0 cm)

From the viewpoint of further improving the durability of the wavelength conversion member containing the cured product obtained by curing the above-mentioned polymerizable composition, the content of the polyfunctional thiol in the polymerizable composition is preferably 5.0% by mass or more, more preferably 10.0% by mass or more, and still more preferably 15.0% by mass or more with respect to the total amount of the composition. In addition, from the viewpoint of further improving the durability, the content of the polyfunctional thiol is preferably 40.0% by mass or less, more preferably 35.0% by mass or less, still more preferably 30.0% by mass or less, even still more preferably 25.0% by mass or less, and even still further more preferably 20.0% by mass or less with respect to the total amount of the composition. The polymerizable composition may contain only one type of polyfunctional thiol, or may contain two or more types of polyfunctional thiols. In a case where two or more types of polyfunctional thiols are contained, the above-mentioned content is intended to refer to a total content of those two or more types of polyfunctional thiols. This point is also the same for the various components of the present invention and the present specification. In addition, in the present invention and the present specification, the content of each component with respect to the total amount of the composition is intended to refer to a content calculated assuming that a total content of all the components excluding a solvent is 100.0% by mass in a case where the polymerizable composition contains the solvent. In a case where the polymerizable composition does not contain a solvent, the content of each component with respect to the total amount of the composition is intended to refer to a content calculated assuming that a total content of all the components contained in the composition is 100.0% by mass.

<(Meth)Acrylate>

The polymerizable composition contains at least one or more polyfunctional (meth)acrylates as the (meth)acrylate. Hereinafter, the polyfunctional (meth)acrylate is referred to as a first (meth)acrylate.

(First (Meth)Acrylate)

The first (meth)acrylate (polyfunctional (meth)acrylate) is one or two or more of di- or higher functional (meth) acrylates, and can be one or two or more selected from the group consisting of difunctional to octafunctional polyfunctional (meth)acrylates, difunctional to heptafunctional polyfunctional (meth)acrylates, difunctional to hexafunctional polyfunctional (meth)acrylates, difunctional to pentafunctional polyfunctional (meth)acrylates, or difunctional to tetrafunctional polyfunctional (meth)acrylates.

Specific examples of the difunctional (meth)acrylate include neopentyl glycol di(meth)acrylate, 1,9-nonanediol di(meth)acrylate, dipropylene glycol di(meth)acrylate, tripropylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, dicyclopentanyl di(meth)acrylate, and tricyclodecanedimethanol di(meth)acrylate.

Specific examples of the tri- or higher functional (meth) acrylate include epichlorohydrin (ECH)-modified glycerol tri(meth)acrylate, ethylene oxide (EO)-modified glycerol tri(meth)acrylate, propylene oxide (PO)-modified glycerol tri(meth)acrylate, trimethylolpropane tri(meth)acrylate, pentaerythritol tetra (meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl) isocyanurate, dipentaerythritol hexa(meth)acrylate, caprolactone-modified dipentaerythritol hexa(meth)acrylate, and dipentaerythritol poly(meth)acrylate.

The molecular weight of the polyfunctional (meth)acrylate contained as the first (meth)acrylate in the polymerizable composition can be, for example, 200 or more. From the viewpoint of the viscosity of the polymerizable composition, the molecular weight of the polyfunctional (meth) acrylate is preferably 1000 or less and more preferably 500 or less.

From the viewpoint of further improving the durability, the content of the first (meth)acrylate in the polymerizable composition is preferably 10.0% by mass or more, more preferably 20.0% by mass or more, and still more preferably 30.0% by mass or more with respect to the total amount of the composition. The polymerizable composition may contain only one type of polyfunctional (meth)acrylate which is the first (meth)acrylate, or may contain two or more types of polyfunctional (meth)acrylates. In a case where the polymerizable composition contains a polyfunctional (meth)acrylate corresponding to the second (meth)acrylate which will be described later and a non-corresponding polyfunctional (meth)acrylate, the content of the polyfunctional (meth) acrylate corresponding to the second (meth)acrylate is not included in the content of the first (meth)acrylate.

The polymerizable composition can also contain, as the (meth)acrylate, one or more mono- or higher functional (meth)acrylates having a functional group selected from the group consisting of a carboxy group, a hydroxy group, a phosphate group, and an amino group. Such a (meth)acrylate is hereinafter referred to as "second (meth)acrylate".

(Second (Meth)Acrylate)

The present inventor presumes that including the second (meth)acrylate in the polymerizable composition contributes to improving the durability and further improving the brightness of the wavelength conversion member containing a cured product obtained by curing the polymerizable composition. The details are as follows.

It is considered that increasing the coverage of the ligand on the surface of the quantum dot leads to a further improvement in brightness. In this regard, it is considered that the coverage of the ligand on the surface of the quantum dot can be increased by using the polyfunctional thiol and another ligand in combination. However, in a case where a compound having a functional group having a higher coordinating ability than a thiol group is used as another ligand to be used in combination, ligand exchange occurs on the surface of the quantum dot and therefore a part of the polyfunctional thiols will be replaced with another ligand, and even if brightness can be improved, durability can be lowered. On the other hand, all of the functional groups of the second (meth)acrylate are considered to have a lower coordinating ability than the thiol group. Therefore, it is presumed that the polyfunctional thiol is not replaced or the frequency of replacement thereof is low in a case of coordination to the surface of the quantum dot. Therefore, the present inventors consider that it is possible to achieve both an improvement in durability that can be brought about by the polyfunctional thiol and a further improvement in brightness by using another ligand.

The second (meth)acrylate has one or more functional groups selected from the group consisting of a carboxy group, a hydroxy group, a phosphate group, and an amino group in one molecule. The number of such functional groups can be 1 to 3 in one molecule, and is preferably 1 or 2 and more preferably 1 in one molecule. In a case where the second (meth)acrylate contains two or more of the above-mentioned functional groups in one molecule, these two or more functional groups may be the same functional groups or different functional groups. The carboxy group may be contained in the form of —COOH or may be contained in the form of a salt. The salt of the carboxy group is a salt represented by $—COO^-M^+$. The phosphate group is a monovalent functional group represented by $—P{=}O(OH)_2$, and may be contained in the form of $—P{=}O(OH)_2$ or may be contained in the form of a salt. The salt of the phosphate group is a salt represented by $—P{=}O(O^-M^+)_2$. In the above, W represents a cation such as an alkali metal ion. The amino group may be a primary amino group, a secondary amino group, or a tertiary amino group. From the viewpoint of further improving the brightness, the functional group is preferably a carboxy group, a hydroxy group, or a phosphate group and more preferably a carboxy group.

The second (meth)acrylate is a mono- or higher functional (meth)acrylate. From the viewpoint of further improving the brightness, the second (meth)acrylate is preferably a monofunctional, difunctional or trifunctional (meth)acrylate, more preferably a monofunctional or difunctional (meth) acrylate, and still more preferably a monofunctional (meth) acrylate. The monofunctional (meth)acrylate can be represented by, for example, the formula: A-L-X. In the formula, A represents any of the above-mentioned functional groups, L represents a divalent linking group, and X represents a (meth)acryloyl group or a (meth)acryloyloxy group. The divalent linking group represented by L can be, for example, one of or a combination of two or three or more of divalent groups selected from the group consisting of an alkylene group, a cycloalkylene group, and an ester group (—O—C(=O)—). Examples of the alkylene group include linear or branched alkylene groups having 1 to 3 carbon atoms (for example, a methylene group, an ethylene group, and a propylene group). Examples of the cycloalkylene group include cycloalkylene groups having 5 to 8 carbon atoms (for example, a cyclopentylene group, a cyclohexylene group, a cycloheptylene group, and a cyclooctylene group). The alkylene group may have or may not have a substituent, and is preferably an unsubstituted alkylene group. This point is also the same for the cycloalkylene group. An acrylic acid can be mentioned as an example of the monofunctional (meth)acrylate having a carboxy group. The acrylic acid is a carboxylic acid represented by $CH_2{=}CHCOOH$, and the carbonyl group (—C(═O)—) is both part of the carboxy group and part of the acryloyl group.

In addition, the molecular weight of the (meth)acrylate contained as the second (meth)acrylate is preferably equal to or less than the molecular weight of the polyfunctional thiol contained in the polymerizable composition, and is more preferably less than the molecular weight of the polyfunctional thiol. It is presumed that the second (meth)acrylate having a molecular weight equal to or less than the molecular weight of the polyfunctional thiol easily approaches the vicinity of the quantum dot even in a case where the quantum dot is coordinated with the polyfunctional thiol, and easily adsorbs to the portion not covered by the polyfunctional thiol on the surface of the quantum dot. The present inventors consider that this can also contribute to increasing the coverage of the ligand on the surface of the quantum dot and therefore further improving the brightness. The molecular weight ratio calculated as "molecular weight ratio (unit: %)=(molecular weight of second (meth)acrylate/molecular weight of polyfunctional thiol)×100" is preferably 100% or less, more preferably 80% or less, and still more preferably 50% or less.

The molecular weight of the (meth)acrylate contained as the second (meth)acrylate in the polymerizable composition can be, for example, 50 or more. From the viewpoint of further improving the durability, the molecular weight of the (meth)acrylate is preferably 70 or more and more preferably 100 or more. In addition, from the viewpoint of further improving the brightness, the molecular weight of the (meth)acrylate contained as the second (meth)acrylate in the polymerizable composition is preferably 500 or less, more preferably 400 or less, still more preferably 300 or less, and even still more preferably 200 or less.

Specific examples of the second (meth)acrylate include carboxy group-containing (meth)acrylates such as acrylic acid, β-carboxyethyl acrylate, 2-acryloyloxyethyl succinate, and 2-acryloyloxyethyl hexahydrophthalate, phosphate group-containing (meth)acrylates such as 2-acryloyloxyethyl acid phosphate, and hydroxy group-containing (meth) acrylates such as 2-hydroxyethyl acrylate.

From the viewpoint of further improving the brightness, the content of the second (meth)acrylate in the polymerizable composition is preferably 0.5% by mass or more and more preferably 3.0% by mass or more with respect to the total amount of the composition. In addition, from the viewpoint of further improving the durability, the content of the second (meth)acrylate is preferably 20.0% by mass or less with respect to the total amount of the composition. The polymerizable composition may contain only one type of (meth)acrylate which is the second (meth)acrylate, or may contain two or more types of (meth)acrylates.

<Phenolic Compound>

In the present invention and the present specification, the term "phenolic compound" is used in the sense of including phenol and a derivative thereof. The phenolic compound can be represented by Formula 1.

(Formula 1)

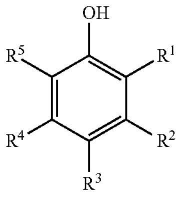

In Formula 1, $R^1$ to $R^5$ each independently represent a hydrogen atom or a substituent. Examples of the substituent include a hydroxy group, an alkyl group, and a carboxy group which may be substituted with an alkyl group.

Examples of the alkyl group include linear or branched alkyl groups having 1 to 6 carbon atoms. The alkyl group includes an unsubstituted alkyl group and an alkyl group having a substituent. In a case where the alkyl group has a substituent, the number of carbon atoms is intended to refer to the number of carbon atoms in the portion excluding the substituent. Examples of the substituent capable of substituting an alkyl group include a hydroxy group and a carboxy group. In one form, the alkyl group is preferably an unsubstituted alkyl group.

The same applies to the alkyl group contained in an alkoxy group and the alkyl group capable of substituting the carboxy group.

The number of hydroxy groups contained in one molecule of the phenolic compound is preferably in a range of 1 to 3, more preferably 2 or 3, and still more preferably 3. For a phenolic compound having a plurality of hydroxy groups, the substitution position of the hydroxy group is not limited, and the hydroxy group can be substituted at any position.

Specific examples of the phenolic compound include pyrogallol, methyl gallate, 4-tert-butylpyrocatechol, 2,6-di-tert-butyl-p-cresol, 4-methoxy-phenol, 2-tert-butyl-4,6-dimethylphenol, 4,4'-butylidene bis(6-tert-butyl-m-cresol), 2,6-di-tert-butylphenol, 2,2',6,6'-tetra-tert-butyl-[1,1'-biphenyl]-4,4'-diol, and 3-(3,5-di-tert-butyl-4-hydroxyphenyl) propionate.

In one form, from the viewpoint of further improving the brightness and/or further improving the liquid stability, the polymerizable composition preferably contains pyrogallol as the phenolic compound. From the viewpoint of further improving the brightness and/or further improving the liquid stability, the content of pyrogallol in the polymerizable composition is preferably 0.001% by mass or more, more preferably 0.003% by mass or more, and still more preferably 0.005% by mass or more with respect to the total amount of the composition. From the viewpoint of further suppressing a decrease in brightness, that is, further improving the durability, the content of pyrogallol in the polymerizable composition is preferably 0.500% by mass or less, more preferably 0.300% by mass or less, and still more preferably 0.100% by mass or less with respect to the total amount of the composition.

The polymerizable composition may contain only one type of phenolic compound or may contain two or more types of phenolic compounds. In a case where two or more types of phenolic compounds are contained, the above description regarding the content of pyrogallol can be referred to for the content of each phenolic compound.

<Quantum Dot>

The polymerizable composition contains one or more quantum dots. The quantum dot can be excited by excitation light to emit fluorescence.

The polymerizable composition may contain only one type of quantum dot, or may contain two or more types of quantum dots having different light-emitting properties. Known quantum dots include a quantum dot (A) having a light emission center wavelength in a wavelength range of 600 nm or longer and 680 nm or shorter, a quantum dot (B) having a light emission center wavelength in a wavelength range of 500 nm or longer and shorter than 600 nm, and a quantum dot (C) having a light emission center wavelength in a wavelength range of 400 nm or longer and shorter than 500 nm. The quantum dot (A) can be excited by excitation light to emit red light, the quantum dot (B) can be excited by excitation light to emit green light, and the quantum dot (C) can be excited by excitation light to emit blue light. For example, in a case where blue light as excitation light is incident on a wavelength conversion member containing quantum dots (A) and quantum dots (B), white light can be realized by red light emitted by the quantum dots (A), green light emitted by the quantum dots (B), and blue light that has passed through the wavelength conversion member. In addition, in a case where ultraviolet light as excitation light is incident on a wavelength conversion member containing quantum dots (A), quantum dots (B), and quantum dots (C), white light can be realized by red light emitted by the quantum dots (A), green light emitted by the quantum dots (B), and blue light emitted by the quantum dots (C).

Examples of the quantum dot include a core-shell type semiconductor nanoparticle. Generally, a semiconductor particle having a particle size of 100 nm or less (for example, several nm to several tens of nm) can be called a semiconductor nanoparticle. Examples of the core include a II-VI group semiconductor nanoparticle, a III-V group semiconductor nanoparticle, and a multicomponent semiconductor nanoparticle. Specific examples of the core include CdSe, CdTe, CdS, ZnS, ZnSe, ZnTe, InP, InAs, and InGaP. However, the core is not limited thereto. CdSe, CdTe, InP, and InGaP are preferable because these core materials can emit visible light with high efficiency. CdS, ZnS, ZnO, GaAs and/or a complex thereof can be used as the shell. However, the shell is not limited thereto. For quantum dots, reference can be made to, for example, known techniques such as paragraphs [0060] to [0066] of JP2012-169271A and paragraphs [0070] to [0076] of WO2018/186300. As the quantum dot, a commercially available product can be used, and a quantum dot produced by a known method can also be used. The light-emitting properties of the quantum dot can usually be adjusted by the composition and/or size of the particle.

In the polymerizable composition, the content of quantum dots can be in a range of, for example, 0.1% to 10.0% by mass with respect to the total amount of the composition.

<Optional Components>

(Monofunctional (Meth)Acrylate)

The polymerizable composition may optionally contain one or more monofunctional (meth)acrylates, for example, as a diluent or the like, in addition to the foregoing components. Such a monofunctional (meth)acrylate does not include the monofunctional (meth)acrylate having the above-mentioned functional group of the second (meth) acrylate. Examples of the monofunctional (meth)acrylate that can be optionally contained include isobornyl (meth) acrylate, cyclohexyl (meth)acrylate, dicyclopentanyl (meth) acrylate, and lauryl (meth)acrylate.

The content of the monofunctional (meth)acrylate may be 0% by mass, 0% by mass or more, or more than 0% by mass with respect to the total amount of the composition of the polymerizable composition. In a case where the composition of the polymerizable composition contains the monofunctional (meth)acrylate, the content thereof is preferably 50.0% by mass or less with respect to the total amount of the composition of the polymerizable composition, from the viewpoint of further improving the durability.

(Additives)

The polymerizable composition may optionally contain one or more additives in addition to the foregoing components. Specific examples of the additive include a polymerization initiator, a polymer, a viscosity adjuster, a silane coupling agent, a surfactant, an antioxidant, an oxygen getter, an inorganic particle, and a light scattering particle. For details such as specific examples of the additive, reference can be made to, for example, paragraphs [108] to [0137], [0162], [0163], and [0165] to [0169] of WO2018/186300. In addition, the polymerizable composition may not contain a solvent, and may contain one or more types of solvents as required. The type and amount of solvent added are not limited. For example, one type of organic solvent or two or more types of organic solvents can be used as the solvent.

The polymerizable composition can be prepared by mixing the above-mentioned various components at the same time or sequentially in any order.

[Cured Product and Wavelength Conversion Member]

One aspect of the present invention relates to a cured product obtained by curing the above-mentioned polymerizable composition.

In addition, one aspect of the present invention relates to a wavelength conversion member containing the cured product.

The degree of curing of the cured product is not limited. The cured product may be a cured product in which the polymerization reaction of the polymerizable composition has partially progressed (generally referred to as a partially cured product, a semi-cured product, or the like), or may be a cured product in which the polymerization reaction is saturated or almost saturated (generally referred to as a completely cured product or the like).

In one form, the wavelength conversion member can have a wavelength conversion layer which is a cured product obtained by curing the polymerizable composition into a film. For a method for manufacturing a wavelength conversion member having such a wavelength conversion layer, reference can be made to, for example, paragraphs [0127] to [0155], and FIG. 2 and FIG. 3 of WO2018/016589.

In addition, in one form, the wavelength conversion member can have a wavelength conversion layer having a resin layer having a plurality of discretely arranged concave portions, and the resin layer can contain a cured product obtained by curing the polymerizable composition. Hereinafter, the wavelength conversion member having the above-described configuration will be described in more detail. In the following, the description may be made with reference to the accompanying drawings. However, the configurations shown in the drawings are examples, and the present invention is not limited to such examples.

<Wavelength Conversion Member>

Figure 2:
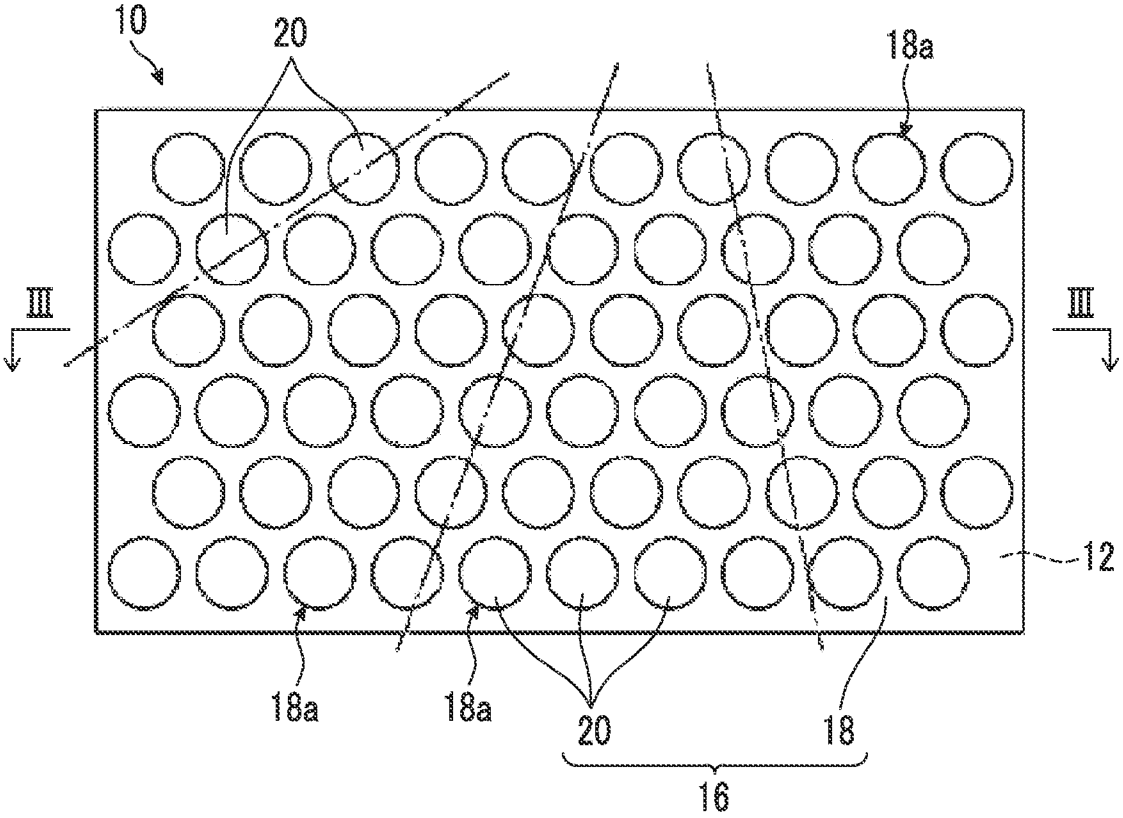
FIG. 2 is a plan view of the wavelength conversion member of FIG. 1.
Figure 3:
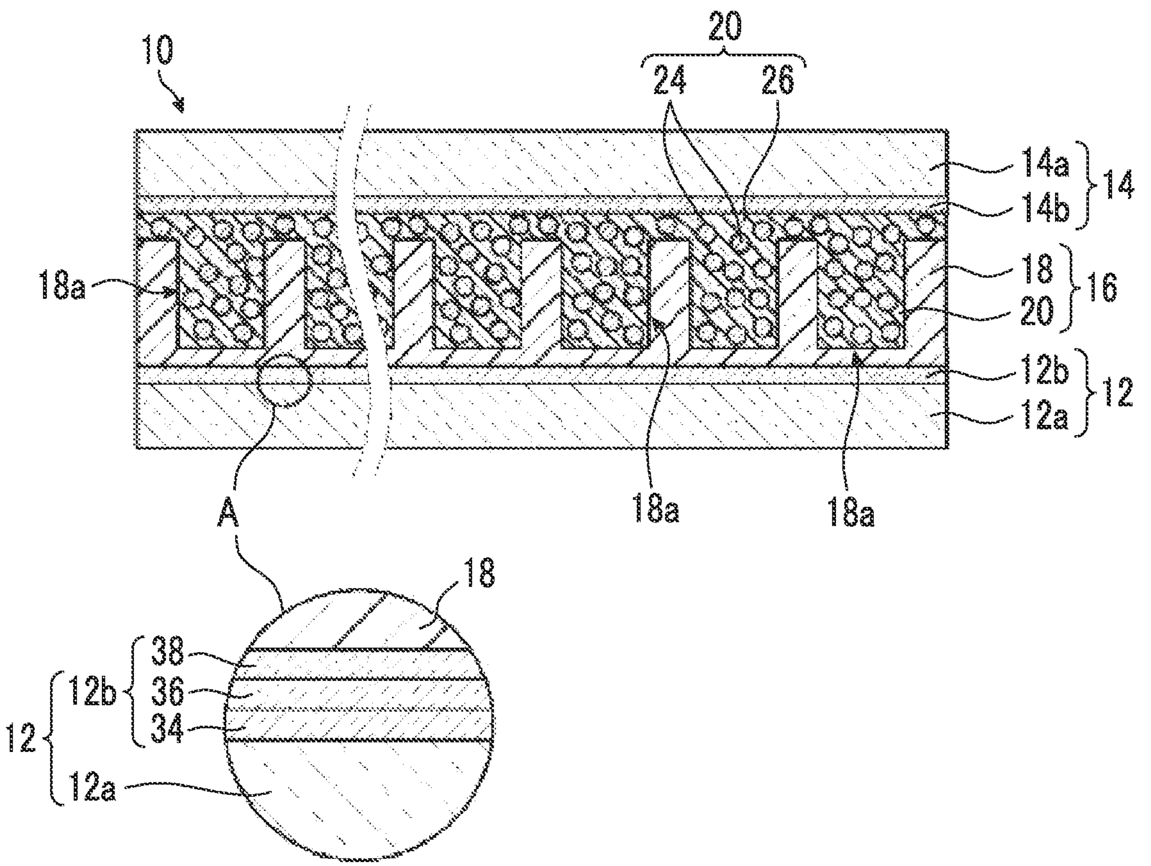
FIG. 3 is a cross-sectional view taken along line of FIG. 1 and FIG. 2.

FIG. 1 is a perspective view of an example of a wavelength conversion member, FIG. 2 is a plan view of the wavelength conversion member shown in FIG. 1, and FIG. 3 is a cross-sectional view taken along line of III-III FIG. 1 and FIG. 2. The plan view of the wavelength conversion member is a view of the wavelength conversion member viewed from a direction orthogonal to a main surface (maximum surface). In the present specification, unless otherwise specified, the plan view is a view of the wavelength conversion member viewed from the second substrate film side.

As shown in FIG. 1 to FIG. 3, a wavelength conversion member 10 has a first substrate film 12, a second substrate film 14, and a wavelength conversion layer 16. In order to clearly show the configuration of the wavelength conversion member 10, the second substrate film 14 is shown by a broken line in FIG. 1, and the second substrate film 14 is omitted in FIG. 2.

As shown in FIG. 3, the first substrate film 12 has, for example, a support film 12*a* and a barrier layer 12*b*. The second substrate film 14 also has a support film 14*a* and a barrier layer 14*b*.

In addition, as shown in FIG. 3, the wavelength conversion layer 16 has a resin layer 18 (see FIG. 4) having concave portions 18*a* discretely formed in the plane direction (main surface direction) of the wavelength conversion member 10 and a cured product (hereinafter, also referred to as "quantum dot-containing portion") 20 formed by curing the above-mentioned polymerizable composition in the concave portions 18*a* of the resin layer 18. The quantum dot-containing portion 20 has quantum dots 24 and a matrix 26 formed by a polymerization reaction of a polymerizable compound. That is, the wavelength conversion layer 16 is provided with a plurality of quantum dot-containing portions 20 spaced apart from each other in a plane direction and containing the quantum dots 24. Specifically, the quantum dot-containing portions, which are regions containing the quantum dots 24, are spaced apart from each other in a plane direction by walls forming the concave portions 18*a* of the resin layer 18 and are then discretely arranged in the plane direction.

In the present invention and the present specification, more specifically, as shown in FIG. 1 and FIG. 2, the phrase "discretely arranged" means that a plurality of quantum dot-containing portions 20 are arranged in isolation without contacting each other in the plane direction of the first substrate film 12, in a case of observing from a direction perpendicular to the main surface of the first substrate film 12 (in a case of viewing in a plan view). In other words, the plane direction of the film is a two-dimensional direction along the film surface (main surface of the film). In the example shown in FIG. 1, the quantum dot-containing portion is cylindrical and is surrounded by the resin layer 18 in the plane direction of the first substrate film 12, and the resin layer 18 makes it difficult for oxygen to invade into the individual quantum dot-containing portions from the plane direction of the first substrate film 12.

The resin layer 18 has impermeability to oxygen preferably at least in a wall portion forming the concave portion 18*a* and more preferably in all regions of the resin layer 18. Accordingly, the wavelength conversion member 10 can prevent deterioration of the quantum dots 24 in the quantum dot-containing portion 20. In the present invention and the present specification, the phrase "has impermeability to oxygen" means that it has an oxygen permeability of 10 cc/($m^2$·day·atm) or less. The oxygen permeability of the resin layer 18 having impermeability to oxygen is preferably 1 cc/($m^2$·day·atm) or less and more preferably $1\times10^{-1}$ cc/($m^2$·day·atm) or less. The SI unit of oxygen permeability is [fm/(s·Pa)]. The "fm" is a femtometer. 1 fm=$1\times10^{-15}$ m. The unit "cc/($m^2$·day·atm)" can be converted into the SI unit by the conversion formula "1 fm/(s·Pa)=8.752 cc/($m^2$·day·atm)".

In addition, in the present invention, the oxygen permeability is a value measured using an oxygen gas permeability measuring device (OX-TRAN 2/20, manufactured by MOCON, Inc.) under the conditions of a measurement temperature of 23° C. and a relative humidity of 90%. In addition, in the present invention and the present specification, the phrase "has impermeability" and the phrase "has barrier properties" are synonymous. For example, in the present invention and the present specification, the term "gas barrier properties" means having impermeability to gas, and the term "water vapor barrier properties" means having impermeability to water vapor. In addition, a layer having impermeability to both oxygen and water vapor is referred to as a "barrier layer".

In the wavelength conversion member 10, the quantum dot-containing portions 20 are discretely arranged in a two-dimensional direction. Therefore, assuming that the wavelength conversion member 10 is a part of a long film, no matter where the wavelength conversion member 10 is cut linearly at any point, as shown by the dashed-dotted line in FIG. 2, the quantum dot-containing portions other than the quantum dot-containing portions that are cut are surrounded by the resin layer 18 and then can be kept sealed in a plane direction. In addition, the quantum dot-containing portion that has been cut and exposed to the outside air may lose its original function as a region containing the quantum dots 24. However, since the quantum dot-containing portion at the cut position, that is, the quantum dot-containing portion at the end portion in a plane direction is usually covered with a member such as a frame that constitutes a display device (display) or the like, it is not required to act as a region containing quantum dots and thus does not affect the performance of the wavelength conversion member. Further, the deactivated quantum dots can serve as a resin layer that protects the quantum dot-containing portion that is not exposed to the outside air from the outside air.

In the wavelength conversion member 10, the first substrate film 12 is laminated on the main surface of the wavelength conversion layer 16 on the bottom side of the concave portion 18*a* of the resin layer 18. That is, the first substrate film 12 is laminated on the main surface on the closed surface (closed end) side of the concave portion 18*a* of the resin layer 18. In the illustrated example, the first substrate film 12 is laminated with the barrier layer 12*b* facing the resin layer 18 side.

On the other hand, the second substrate film 14 is laminated on the main surface of the resin layer 18 constituting the wavelength conversion layer 16 opposite to the first substrate film 12. That is, the second substrate film 14 is laminated on the main surface on the opening surface (opening end) side of the concave portion 18*a* of the resin layer 18. In the illustrated example, the second substrate film 14 is laminated with the barrier layer 14*b* facing the resin layer 18 side.

Depending on the method of forming the resin layer, in the wavelength conversion layer, the resin layer may have through-holes instead of concave portions, and the through-holes may be filled with quantum dot-containing portions using the substrate film as the bottom surface. In this case, one of the two substrate films sandwiching the resin layer, that is, the wavelength conversion layer, is regarded as the first substrate film, the other substrate film is regarded as the second substrate film, and the through-holes are regarded as the concave portions of the resin layer, and the first substrate film is regarded as the bottom of the concave portions of the resin layer, and on the side of the substrate film regarded as the second substrate film, the end portion of the wall portion of the resin layer 18 may be spaced apart from the second substrate film as will be described later.

Here, in the wavelength conversion member 10, as shown in FIG. 3, the wall portion forming the concave portion 18*a* of the resin layer 18 is preferably spaced apart from the second substrate film 14 at the end portion on the second substrate film 14 side. Further, in the wavelength conversion member 10, it is preferable that the quantum dot-containing portion is also present between the second substrate film 14 and the end portion of the wall portion of the resin layer 18 spaced apart from the second substrate film 14 on the second substrate film 14 side. In a wavelength conversion member having a configuration in which a wavelength conversion layer in which a quantum dot-containing portion is divided into a plurality of regions is sealed with two substrate films, the adhesion between the wavelength conversion layer and the substrate film can be enhanced by providing a gap between the substrate film and the wall portion that divides the quantum dot-containing portion into a plurality of regions, and allowing the quantum dots to exist also in this gap.

In the following description, the second substrate film 14 side of the wavelength conversion member 10, that is, the opening side of the concave portion 18*a* of the resin layer 18 is also referred to as "upper", and the first substrate film 12 side, that is, the bottom side of the concave portion 18*a* of the resin layer 18 is also referred to as "lower".

Specifically, the wall portion forming the concave portion 18*a* of the resin layer 18 is a portion between the concave portion 18*a* and the concave portion 18*a* of the resin layer 18, in the plane direction of the substrate film and a portion that forms the plane direction outer periphery of the resin layer 18. That is, the wall portion forming the concave portion 18*a* of the resin layer 18 is, in other words, a region between the quantum dot-containing portion and the quantum dot-containing portion in the plane direction of the wavelength conversion layer 16 and a resin layer 18 in the region outside the outermost quantum dot-containing portion in the plane direction.

Figure 4:
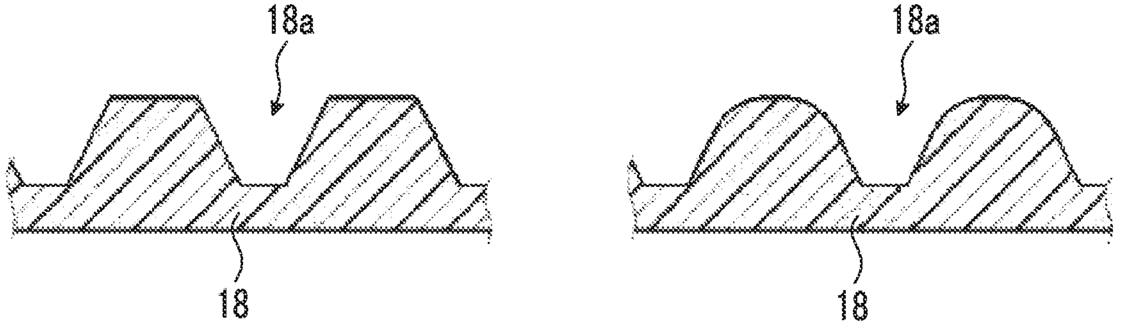
FIG. 4 is a cross-sectional view for illustrating an example of a shape of a resin layer of the wavelength conversion member.

In addition, in the examples shown in FIG. 1 to FIG. 3, the quantum dot-containing portion (quantum dot-containing portion in the concave portion 18*a*) is cylindrical, and the wall portion forming the concave portion 18*a* of the resin layer 18 has a rectangular cross-sectional shape. However, the present invention is not limited thereto, and the cross-sectional shape of the wall portion can be of various shapes. For example, the wall portion forming the concave portion 18*a* of the resin layer 18 may have a trapezoidal cross-sectional shape as conceptually shown on the left side of FIG. 4, or may have a cross-sectional shape in which the corner portions on the upper bottom side of the trapezoid are chamfered into a curved surface as conceptually shown on the right side of FIG. 4. As shown in FIG. 4, the cross-sectional shape of the wall portion of the resin layer 18 is preferably a shape that gradually widens downward from the top, at least in part, preferably from the upper end to the lower end. Here, "downward from the top" means from the end portion on the second substrate film 14 side toward the first substrate film 12 side. Above all, as shown on the right side of FIG. 4, a shape in which the corner portion of the upper surface on the second substrate film side is chamfered is preferable. Such a shape is advantageous in terms of ease of manufacturing a mold for forming the resin layer 18, ease of removal of the mold in a case of forming the resin layer 18, prevention of damage to the resin layer 18 to be formed, and the like.

The upper end of the wavelength conversion member 10 is spaced apart from the second substrate film 14 at the wall portion forming the concave portion 18*a* of the resin layer 18. In addition, the quantum dot-containing portion is provided not only in the concave portion 18*a* of the resin layer 18 but also between the second substrate film 14 and the upper end of the wall portion spaced apart from the second substrate film 14. In the wavelength conversion member 10 of the illustrated example, as shown in FIG. 3, all the wall portions are spaced apart from the second substrate film 14 at the upper ends, and a quantum dot-containing portion is provided between the wall portion and the second substrate film 14. Having such a configuration makes it possible to improve the adhesion between the wavelength conversion layer 16 containing the quantum dots 24 and the second substrate film on the upper side, that is, on the opening side of the concave portion 18*a* of the resin layer 18.

As will be described later, in the manufacture of the wavelength conversion member, as an example, a mold having concavities and convexities corresponding to concave portions and wall portions of the resin layer is filled with a coating liquid that will form a resin layer (composition for forming a resin layer), the first substrate film is laminated to cover the coating liquid filled in the mold, the coating liquid that will form a resin layer is cured, and the mold is removed to thereby form a laminate of the first substrate film and the resin layer. Next, the concave portions of the resin layer are filled with the above-mentioned polymerizable composition containing quantum dots, the second substrate film is laminated on the resin layer to seal the polymerizable composition filled in the resin layer, and then the polymerizable composition is cured to produce a wavelength conversion member in which a wavelength conversion layer having a resin layer and a quantum dot-containing portion is sandwiched between the first substrate film and the second substrate film.

The first substrate film and the resin layer can be laminated with sufficient adhesion since the resin layer is laminated in the state of a coating liquid and then the coating liquid is cured. In addition, the resin layer and the quantum dot-containing portion can also be laminated with sufficient adhesion since the concave portions are filled with the polymerizable composition which is then cured. Here, regarding the wavelength conversion layer and the second substrate film, the region corresponding to the concave portion of the resin layer which is filled with the polymerizable composition containing quantum dots is filled with a fluorescent material in the state of a coating liquid which is then cured, and therefore favorable adhesion can be obtained. Further, the adhesion between the wavelength conversion layer 16 and the second substrate film 14 can be increased by a configuration where, in the resin layer 18, the upper end of at least a part of the wall portion constituting the concave portion 18*a* is spaced apart from the second substrate film 14, and the quantum dot-containing portions are present not only in the concave portion 18*a* but also between the second substrate film 14 and the upper end of the wall portion spaced apart from the second substrate film 14. In the present invention and the present specification, the phrase "between the second substrate film 14 and the upper end of the wall portion spaced apart from the second substrate film 14" includes not only a region directly above the wall portion whose upper end is spaced apart from the second substrate film 14 but also a region between the second substrate film 14 and the concave portion 18*a* (the upper end portion thereof) adjacent to the wall portion whose upper end is spaced apart from the second substrate film 14 in a plane direction.

In the wavelength conversion member 10, the wall portion of the resin layer 18 spaced apart from the second substrate film 14 is not limited to a configuration in which, as shown in FIG. 3, the upper ends of all the wall portions are spaced apart from the second substrate film 14 and the quantum dot-containing portions are provided therebetween. A greater number of wall portions of the resin layer 18 spaced apart from the second substrate film 14 can lead to higher adhesion between the wavelength conversion layer 16 and the second substrate film 14. Considering this point, in the wavelength conversion member 10, it is preferable that the upper end of the wall portion of the portion corresponding to the area of 30% or more of the area of a display unit of a display device in which the wavelength conversion member 10 is used is spaced apart from the second substrate film 14, and in the wall portion, it is more preferable that the upper ends of all the wall portions are spaced apart from the second substrate film 14, and the quantum dot-containing portion and the second substrate film 14 are in contact with each other over the entire surface.

Figure 5:
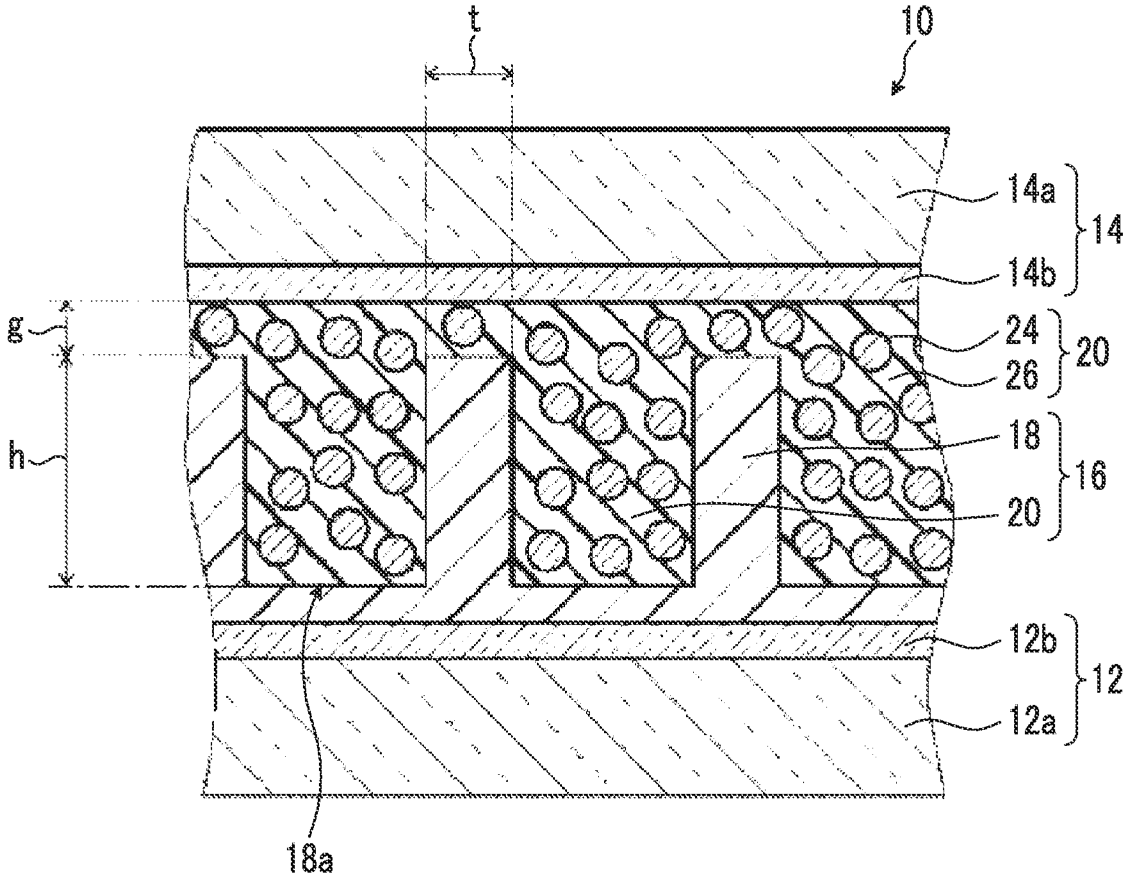
FIG. 5 is a partially enlarged view of FIG. 3.

With regard to the wavelength conversion member 10, in the wall portion whose upper end is spaced apart from the second substrate film, a gap g (shortest distance) between the upper end (uppermost portion) of the wall portion and the second substrate film 14 is not particularly limited as long as both are spaced apart from each other (see FIG. 5). Here, the gap g between the upper end of the wall portion and the second substrate film 14 is preferably 0.01 to 10 μm, more preferably 0.05 to 4 μm, and still more preferably 0.1 to 4 μm. By setting the gap g between the upper end of the wall portion and the second substrate film 14 to 0.01 μm or more, the effect of the presence of the quantum dot-containing portion between the upper end of the wall portion and the second substrate film 14 is sufficiently exhibited, and the adhesion between the wavelength conversion layer 16 and the second substrate film 14 can be sufficiently increased. In addition, the quantum dot-containing portion is more permeable to oxygen than the resin layer 18 and therefore, in a case where the gap g between the upper end of the wall portion and the second substrate film 14 is too large, oxygen may permeate through the gap between the upper end of the wall portion and the second substrate film 14 and then the quantum dots 24 may deteriorate. On the other hand, by setting the gap g between the upper end of the wall portion and the second substrate film 14 to 10 μm or less, it is possible to sufficiently suppress the permeation of oxygen in the gap between the upper end of the wall portion and the second substrate film 14 and prevent the deterioration of the quantum dots 24 due to oxygen. On the other hand, in a case where a mixed layer 28 or an impermeable layer 30 which will be described later is provided between the upper end of the wall portion and the second substrate film 14, setting the gap g between the upper end of the wall portion and the second substrate film 14 to 10 μm or less makes it possible to prevent a decrease in light emission brightness due to the mixed layer 28 or the impermeable layer 30 being too thick. The gap g between the upper end of the wall portion and the second substrate film 14 may be obtained, for example, by cutting a portion of the wall portion of the wavelength conversion member 10 with a microtome or the like to form a cross section, and observing the section with a scanning electron microscope (SEM) or the like. The "portion of the wall portion of the wavelength conversion member 10" is "a portion of the wavelength conversion member 10 that is not the concave portion 18*a*". The gap g can be obtained as an arithmetic average of the measured values at 10 randomly selected locations.

In the wavelength conversion member 10, a depth h of the concave portion 18*a* of the resin layer 18 and a distance t between the adjacent quantum dot-containing portions (the quantum dot-containing portions in the adjacent concave portions 18*a*) are not particularly limited. The depth h of the concave portion of the resin layer 18 is preferably a depth that allows the thickness of the quantum dot-containing portion from the bottom of the concave portion 18*a* to the second substrate film 14 (that is, "depth h+gap g") to be 1 to 100 μm. In addition, the distance t between the adjacent quantum dot-containing portions is preferably 5 to 300 μm.

The thickness (which can also be referred to as height) of the quantum dot-containing portion is preferably 1 μm or more from the viewpoint of easiness of reaching the target chromaticity. On the other hand, in a case where the quantum dot-containing portion becomes thicker, the amount of light absorbed by the quantum dot-containing portion increases. Considering these points, the thickness of the quantum dot-containing portion from the bottom of the concave portion 18*a* to the second substrate film 14 is preferably 1 to 100 μm, more preferably 5 to 80 μm, and still more preferably 10 to 50 μm. The depth h of the concave portion 18*a* formed in the resin layer 18 and the thickness of the quantum dot-containing portion from the bottom of the concave portion 18*a* to the second substrate film 14 may be obtained by cutting a portion of the concave portion 18*a* of the wavelength conversion member with a microtome or the like to form a cross section, and observing the cross section with a confocal laser microscope or the like in a state where the wavelength conversion layer 16 is irradiated with excitation light to cause the quantum dots to emit light. For the depth h and the thickness of the quantum dot-containing portion, an arithmetic average of the measured values of 10 randomly selected quantum dot-containing portions can be adopted.

In addition, the distance t between the adjacent quantum dot-containing portions, that is, the thickness of the wall portion of the resin layer 18 between the adjacent quantum dot-containing portions (between the adjacent concave portions 18*a*) is preferably short (thin wall portion) in order to make the resin layer 18 invisible. On the other hand, from the viewpoint of strength and durability, the distance t between the adjacent quantum dot-containing portions is preferably a value equal to or greater than a certain value. From these viewpoints, the distance t between the adjacent quantum dot-containing portions is preferably 5 to 300 μm, more preferably 10 to 200 μm, and still more preferably 15 to 100 μm. The distance t between the adjacent quantum dot-containing portions is the shortest distance between the adjacent quantum dot-containing portions. This distance t can be obtained by observing the surface from one surface of the wavelength conversion member 10 using a confocal laser microscope or the like, in a state where the wavelength conversion layer 16 is irradiated with excitation light to cause the quantum dots to emit light, and measuring the thickness of the wall portion of the resin layer 18 between the adjacent quantum dot-containing portions. In addition, an arithmetic average of the distances of 20 randomly selected locations can be adopted as the distance t between the adjacent quantum dot-containing portions.

The shape, size, arrangement pattern, and the like of the quantum dot-containing portion are not particularly limited and may be appropriately designed. In the design, it is possible to consider the geometrical constraint for arranging the quantum dot-containing portions spaced apart from each other in a plan view, the allowable value of the width of the non-light emitting region generated at the time of cutting, and the like. In addition, for example, in a case where a printing method is used as one of methods for forming a quantum dot-containing portion as will be described later, it is preferable that each occupied area is equal to or larger than a certain size from the viewpoint of ease of printing. The occupied area at this time is an occupied area in a plan view. Further, from the viewpoint of improving the mechanical strength of the wavelength conversion member, it is preferable that the shortest distance between the adjacent quantum dot-containing portions, that is, the thickness of the wall portion is large. The shape, size, and arrangement pattern of the quantum dot-containing portion may be designed in consideration of these points.

The ratio of a volume Vp of the quantum dot-containing portion to a volume Vb of the resin layer 18 can be any ratio. In one form, for the ratio "Vp/(Vp+Vb)", $0.1 \le Vp/(Vp+Vb) < 0.9$ is preferable, $0.2 \le Vp/(Vp+Vb) < 0.85$ is more preferable, and $0.3 \le Vp/(Vp+Vb) < 0.8$ is still more preferable. Here, the volume Vp of the quantum dot-containing portion and the volume Vb of the resin layer 18 are defined as the products of the respective areas and thicknesses in a case of observing from a direction orthogonal to the main surface of the wavelength conversion member 10.

Figure 6:
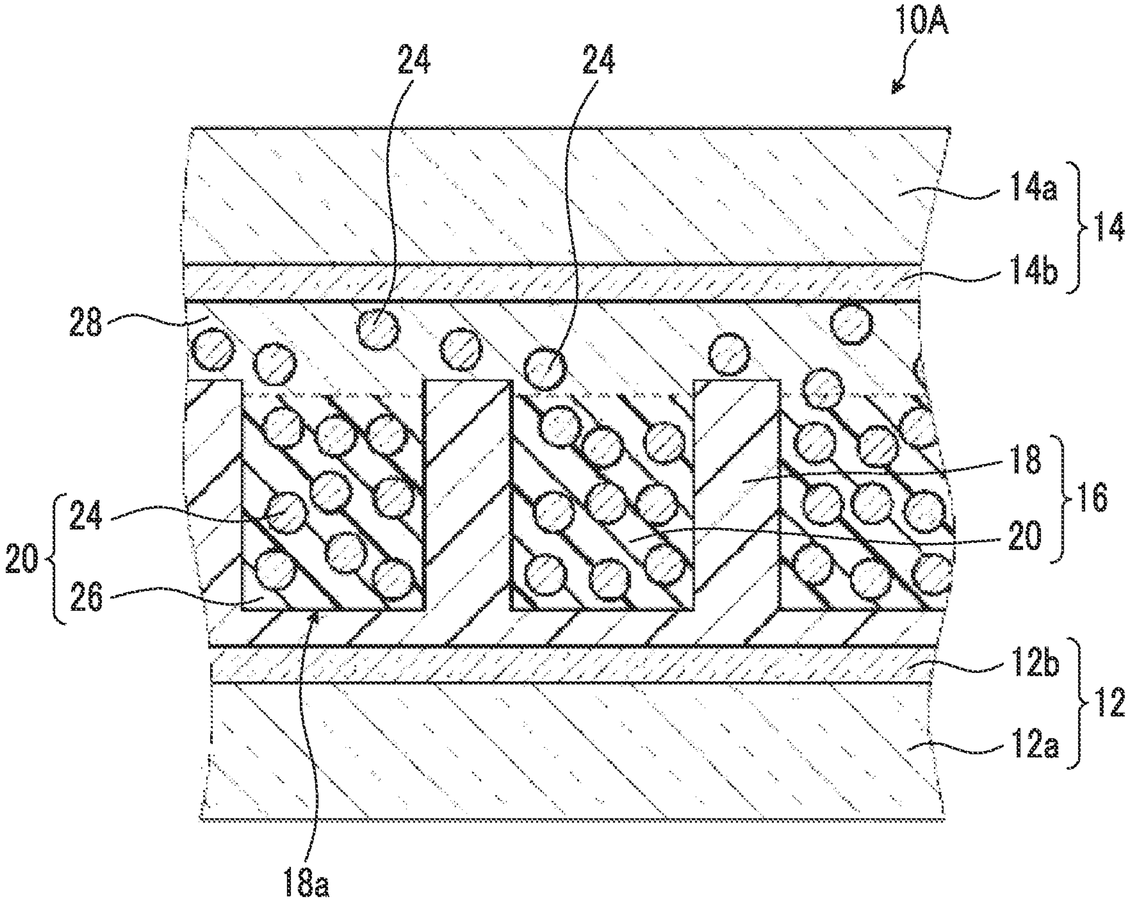
FIG. 6 is a cross-sectional view conceptually showing another example of the wavelength conversion member.

In the wavelength conversion layer, the quantum dot-containing portion between the upper end of the wall portion forming the concave portion 18*a* and the second substrate film 14 and between the concave portion 18*a* (the upper end portion thereof) and the second substrate film 14 may contain a material impermeable to oxygen in addition to the quantum dot-containing portion. FIG. 6 conceptually shows an example thereof with a cross-sectional view of the wavelength conversion member. Since the wavelength conversion member shown in FIG. 6 includes the same members as in the wavelength conversion member 10, the same members are designated by the same reference numerals, and the description thereof will be given mainly for different parts. The same applies to other drawings in this regard.

In a wavelength conversion member 10A shown in FIG. 6, the mixed layer 28 contains quantum dots and a material having impermeability to oxygen. In the following description, the "material having impermeability to oxygen" is also referred to as "oxygen-impermeable material". Having such a mixed layer 28 makes it possible for the wavelength conversion member 10A to prevent permeation of oxygen into the quantum dot-containing portion between the upper end of the wall portion forming the concave portion 18*a* and the second substrate film 14, and therefore deterioration of the quantum dots 24 due to oxygen can be suppressed. In the present invention and the present specification, the term "oxygen-impermeable material" preferably refers to a material that, in a case of being formed into a film having a thickness of 50 μm, has an oxygen permeability of 200 cc/($m^2$·day·atm) or less. The oxygen-impermeable material is more preferably a material that, in a case of being formed into a film having a thickness of 50 μm, has an oxygen permeability of 20 cc/($m^2$·day·atm) or less, and still more preferably a material that, in a case of being formed into a film having a thickness of 50 μm, has an oxygen permeability of 2 cc/($m^2$·day·atm) or less. Specific examples of the oxygen-impermeable material include various materials exemplified later as a material for forming the resin layer 18. Above all, the mixed layer 28 preferably contains a material containing the same components as in the material for forming the resin layer 18 as the oxygen-impermeable material.

The mixed layer 28 is not limited to the configuration formed between the upper end of the wall portion and the second substrate film 14 and above the concave portion 18*a*, as shown in FIG. 6. For example, the mixed layer 28 may not be formed in the concave portion 18*a*, and may be formed only between the upper end of the wall portion forming the concave portion 18*a* and the second substrate film 14, or may have a configuration in which the upper portion is the mixed layer 28 and the lower portion is the quantum dot-containing portion between the upper end of the wall portion forming the concave portion 18*a* and the second substrate film 14.

The content of the oxygen-impermeable material in the mixed layer 28 is not particularly limited. A higher content of the oxygen-impermeable material in the mixed layer 28 makes it possible to further prevent deterioration of the quantum dots 24 due to oxygen. On the other hand, in a case where the content of the oxygen-impermeable material in the mixed layer 28 increases, the content of the quantum dots 24 relatively decreases, so the optical characteristics of the mixed layer 28, in other words, the optical characteristics of the wavelength conversion member 10A decrease. Considering these points, the content of the oxygen-impermeable material in the mixed layer 28 is preferably, for example, 40% to 90% by mass and more preferably 50% to 80% by mass.

In addition, the thickness of the mixed layer 28 is not particularly limited. In the mixed layer 28, the content of the quantum dots 24 is usually lower than that of the quantum dot-containing portion. Therefore, considering the optical characteristics of the wavelength conversion member 10A, it is preferable that the thickness (vertical size) of the mixed layer 28 is thin. On the other hand, from the viewpoint of preventing deterioration of the quantum dots 24, it is preferable that the mixed layer 28 is thick. Considering these points, for example, in a case where it is important to prevent deterioration of the quantum dots 24, it is preferable that the entire area between the upper end of the wall portion forming the concave portion 18*a* and the second substrate film 14 is a mixed layer.

Further, as in a wavelength conversion member 10B conceptually shown in FIG. 7, the wavelength conversion layer may have, in addition to the mixed layer 28, a layer (hereinafter, referred to as "impermeable layer") 30 containing no quantum dots 24 and containing the same oxygen-impermeable material as the oxygen-impermeable material contained in the mixed layer 28, between the mixed layer 28 and the second substrate film 14. Having the impermeable layer 30 makes it possible to further prevent deterioration of the quantum dots 24 due to oxygen that permeates between the upper end of the wall portion and the second substrate film 14.

The thickness of the impermeable layer 30 in the wavelength conversion member 10B is not particularly limited. The impermeable layer 30 can be a layer that does not contain the quantum dots 24 and is formed only of an oxygen-impermeable material. Therefore, similarly to the mixed layer 28, a thicker impermeable layer 30 is advantageous for preventing deterioration of the quantum dots 24 due to oxygen. On the other hand, from the viewpoint of optical characteristics of the wavelength conversion member, the impermeable layer 30 is preferably thin. In a case where the wavelength conversion member 10B has the impermeable layer 30, the thickness of the impermeable layer 30 may be appropriately set in consideration of these points.

The mixed layer 28 and the impermeable layer 30 can be formed by various methods. As described above, the wavelength conversion member 10 can be manufactured in such a manner that the resin layer 18 is formed on the surface of the first substrate film 12, the concave portion 18*a* of the resin layer 18 is filled with the above-mentioned polymerizable composition containing quantum dots, the second substrate film 14 is laminated on the resin layer 18 to seal the polymerizable composition filled in the resin layer 18, and then the polymerizable composition to be the quantum dot-containing portion is cured. As an example, in this manufacturing method, before laminating the second substrate film 14, a coating liquid containing an oxygen-impermeable material is applied to the surface of the second substrate film 14 on the resin layer 18 side. Then, the second substrate film 14 is laminated on the resin layer 18 with the coating liquid containing an oxygen-impermeable material facing the resin layer 18. As a result, the above-mentioned polymerizable composition which is cured to become a quantum dot-containing portion and the coating liquid containing an oxygen-impermeable material are mixed between the upper end of the wall portion and the second substrate film 14. Then, by curing the mixture of the coating liquid containing an oxygen-impermeable material and the above-mentioned polymerizable composition, the mixed layer 28 containing the oxygen-impermeable material in addition to the quantum dots can be formed between the upper end of the wall portion and the second substrate film 14. At this time, by adjusting the coating thickness of the coating liquid containing an oxygen-impermeable material to be applied to the second substrate film 14, it is possible to set whether only the mixed layer 28 is formed or both the mixed layer 28 and the impermeable layer 30 are formed. Specifically, by increasing the coating thickness of the coating liquid containing an oxygen-impermeable material, the impermeable layer 30 can be formed in addition to the mixed layer 28. The impermeable layer 30 becomes thicker as the coating thickness of the coating liquid is increased. This point will be described in detail later.

The wavelength conversion member 10 (10A, 10B) can have a configuration in which the resin layer 18 and the wavelength conversion layer 16 having a quantum dot-containing portion are sandwiched between the first substrate film 12 and the second substrate film 14. Further, the wavelength conversion member 10 may have the mixed layer 28 and/or the impermeable layer 30 in addition to the resin layer 18 and the quantum dot-containing portion.

It is preferable that both the first substrate film 12 and the second substrate film 14 are films that are impermeable to oxygen. In the wavelength conversion member 10, in one form, the first substrate film 12 has a configuration in which the barrier layer 12*b* is laminated on the support film 12*a*, and the barrier layer 12*b* is laminated on the wavelength conversion layer 16 with the barrier layer 12*b* facing the wavelength conversion layer 16. Similarly, the second substrate film 14 also has a configuration in which the barrier layer 14*b* is laminated on the support film 14*a*, and the barrier layer 14*b* is laminated on the wavelength conversion layer 16 with the barrier layer 14*b* facing the wavelength conversion layer 16.

Various known barrier layers can be used for the barrier layer 12*b* of the first substrate film 12 as long as those layers have oxygen impermeability. Similarly, various known barrier layers can be used for the barrier layer 14*b* of the second substrate film 14 as long as those layers have oxygen impermeability. The first substrate film 12 and the second substrate film 14 can have the same configuration except that the lamination positions of layers are different. Therefore, except for a case where it is necessary to distinguish between the first substrate film 12 and the second substrate film 14, the following description will refer to the first substrate film 12 as a representative example.

Various known barrier layers can be used as the barrier layer 12*b* of the first substrate film 12. It is preferable to have at least one inorganic layer, and an organic/inorganic lamination type barrier layer having one or more combinations of an inorganic layer and an organic layer serving as an underlayer of the inorganic layer is more preferable.

In the wavelength conversion member 10 of the illustrated example, the barrier layer 12*b* of the first substrate film (and the barrier layer 14*b* of the second substrate film 14) has, as shown in the partially enlarged view A of FIG. 3, a configuration in which three layers of an underlying organic layer 34 formed on the surface of the support film 12*a* (the support film 14*a*), an inorganic layer 36 formed on the underlying organic layer 34, and a protective organic layer 38 formed on the inorganic layer 36 are laminated.

The surface of the support film 12*a*, that is, the underlying organic layer 34 under the inorganic layer 36 is an underlayer (undercoat layer) for properly forming the inorganic layer 36. In the organic/inorganic lamination type barrier layer, the portion that mainly exhibits the barrier properties is the inorganic layer 36. Therefore, by forming the underlying organic layer 34 and forming the inorganic layer 36 thereon, the surface on which the inorganic layer 36 is formed can be made appropriate and the inorganic layer 36 with no defects can be formed, and therefore high barrier properties can be obtained. The barrier layer 12*b* of the illustrated example has only one combination of the underlying organic layer 34 and the inorganic layer 36, but the barrier layer may have a plurality of combinations of the underlying organic layer 34 and the inorganic layer 36. The greater the number of combinations of the underlying organic layer 34 and the inorganic layer 36, the higher the barrier properties can be obtained.

The protective organic layer 38 formed on the surface of the inorganic layer 36 is a protective layer (overcoat layer) that protects the inorganic layer 36 that mainly exhibits the barrier properties. Having the protective organic layer 38 makes it possible to prevent breakage and chipping of the inorganic layer 36 and prevent deterioration of the barrier properties of the barrier layer 12*b* due to damage to the inorganic layer 36.

Figure 8:
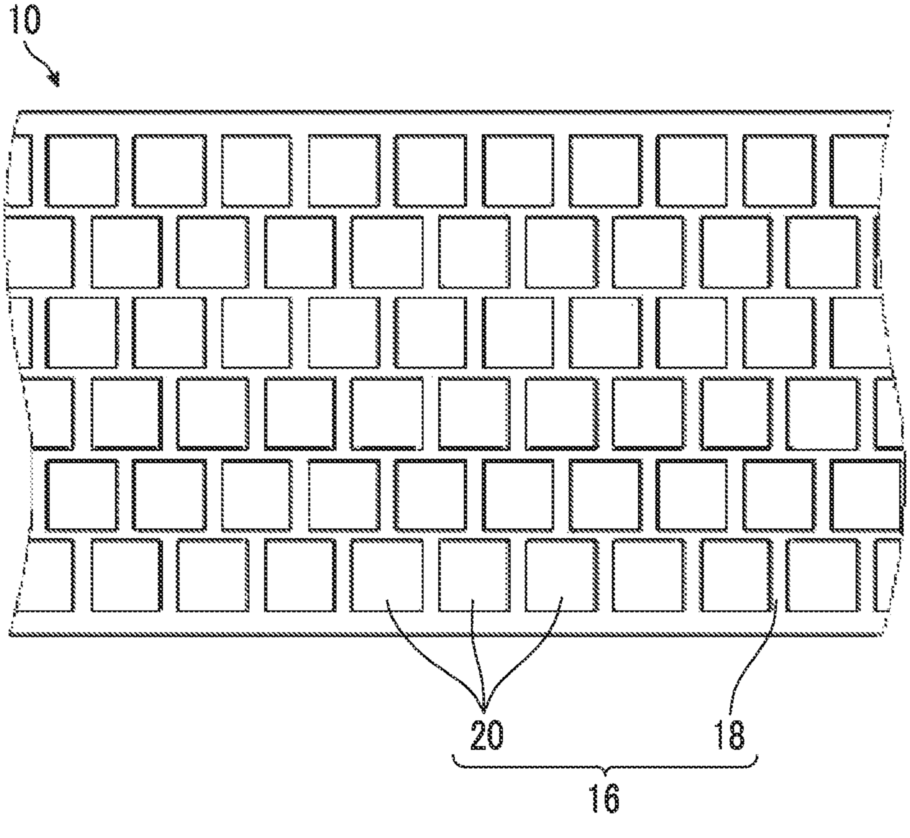
FIG. 8 is a plan view showing an example of a pattern of a quantum dot-containing portion.
Figure 9:
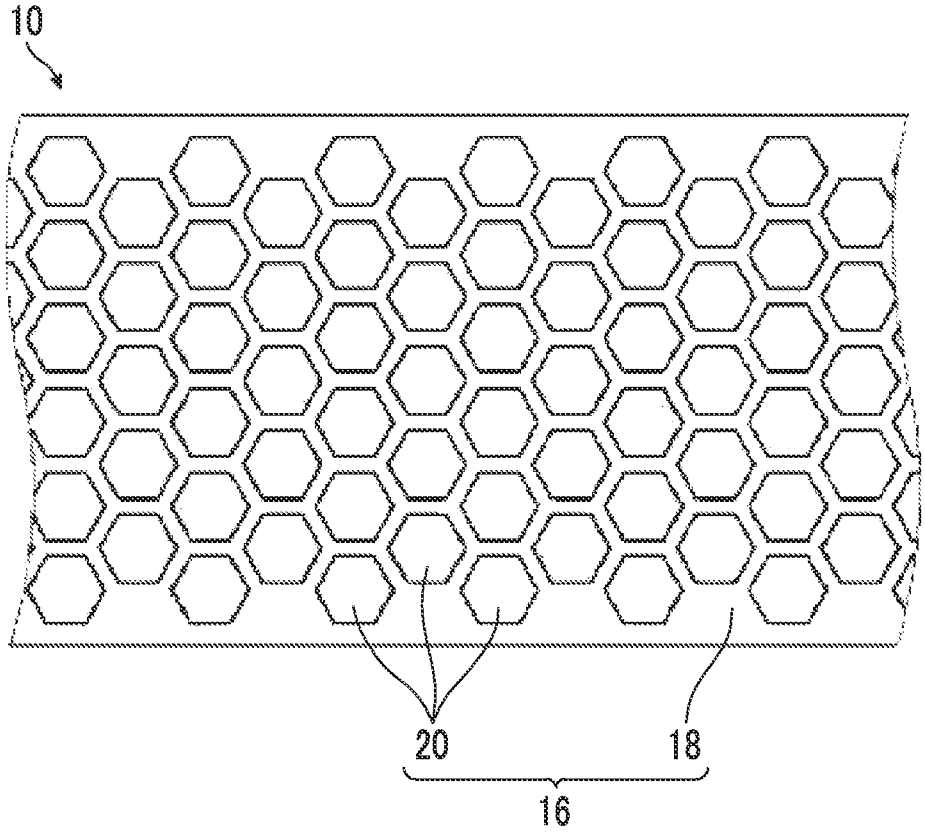
FIG. 9 is a plan view showing another example of the pattern of the quantum dot-containing portion.

In the wavelength conversion member 10 shown in FIG. 1 to FIG. 3, the quantum dot-containing portion (concave portion 18*a*) is cylindrical and is circular in a plan view. In this regard, the shape of the quantum dot-containing portion is not particularly limited. For example, the quantum dot-containing portion may be a polygonal prism, such as a quadrangle in a plan view as shown in FIG. 8, or a hexagon (honeycomb structure) in a plan view as shown in FIG. 9, or may be a regular polygonal prism. In addition, in the above-mentioned example, the bottom surface of the cylinder or polygonal prism is arranged parallel to the substrate film surface. In this regard, the bottom surface does not necessarily have to be arranged parallel to the substrate film surface. In addition, the shape of each quantum dot-containing portion may be irregular.

Figure 10:
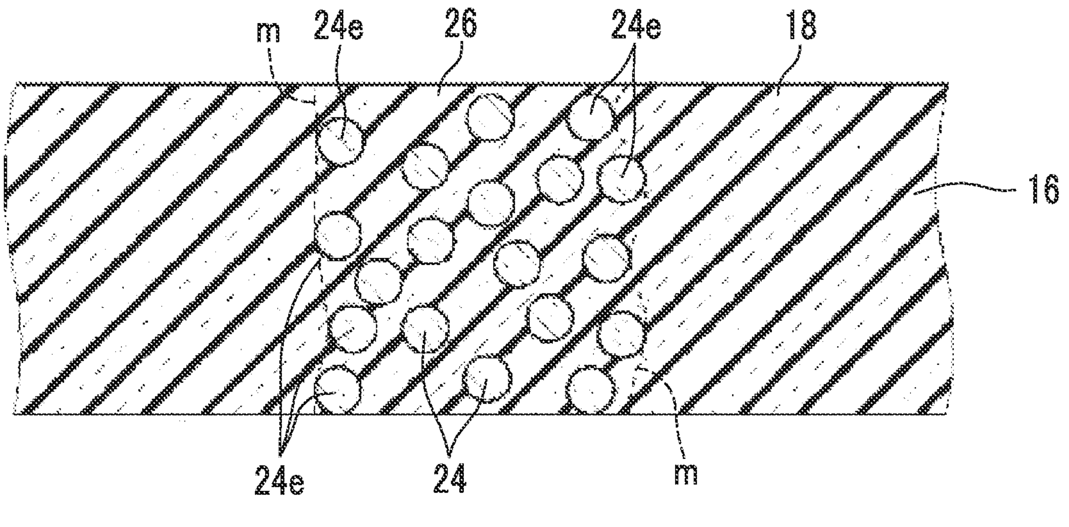
FIG. 10 is a conceptual diagram for illustrating a method of specifying a contour of the quantum dot-containing portion.

In a case where the boundary between the matrix 26 of the quantum dot-containing portion and the resin layer 18 is not clear, a line connecting points outside (side where the quantum dots 24 are not arranged) the quantum dots 24*e* located in the outermost portion of the region where the quantum dots 24 are arranged close to each other is regarded as a contour m of the quantum dot-containing portion (boundary between the quantum dot-containing portion and the resin layer 18), as shown in FIG. 10. The position of the quantum dot can be specified by irradiation of the wavelength conversion layer with excitation light to cause the quantum dots to emit light and observation with, for example, a confocal laser microscope, whereby the contour m of the quantum dot-containing portion can be specified. In the present invention and the present specification, with respect to the sides of a cylinder, a polygonal prism, or the like, a meandering shape such as the contour of FIG. 10 is also allowed. In addition, in the above-described form, the quantum dot-containing portions are periodically arranged in a pattern. In this regard, as long as a plurality of quantum dot-containing portions are discretely arranged, the arrangement of the quantum dot-containing portions may be aperiodic as long as the desired performance is not impaired. It is preferable that the quantum dot-containing portions are uniformly distributed over the entire wavelength conversion layer 16 because the in-plane distribution of brightness is uniform.

In order to make an amount of fluorescence sufficient, it is preferable that the region occupied by the quantum dot-containing portion is large. The quantum dots 24 in the quantum dot-containing portion may be one type or a plurality of types. In addition, the quantum dots 24 in one quantum dot-containing portion are one type, and among a plurality of quantum dot-containing portions, a region containing first quantum dots and a region containing second quantum dots different from the first quantum dots may be arranged periodically or aperiodically. The number of types of quantum dots may be three or more. The details of the quantum dots are as described above.

As described above, the wavelength conversion layer is not particularly limited in the shape of the quantum dot-containing portion, the arrangement pattern of the quantum dot-containing portions, and the like. In any case, the quantum dot-containing portions are discretely arranged on the film surface, and therefore the quantum dots in the quantum dot-containing portion at the cut end portion may deteriorate. However, since the quantum dots in the portion other than the cut end portion are surrounded and sealed by the resin in the direction along the film surface, it is possible to suppress the deterioration of the performance due to the invasion of oxygen from the direction along the film surface.

Each constituent element of the wavelength conversion member will be described below.

As described above, the wavelength conversion member 10 shown in FIG. 1 to FIG. 3 has a configuration in which the wavelength conversion layer 16 is laminated on one film surface of the first substrate film 12, and the second substrate film 14 is further laminated on the wavelength conversion layer 16, so that the wavelength conversion layer 16 is sandwiched between the two substrate films.

(Resin Layer)

The resin layer 18 can be formed, for example, by preparing a composition for forming a resin layer containing a polymerizable compound similar to the polymerizable compound forming the matrix 26, applying the composition, and curing the composition. The resin layer 18 is preferably impermeable to oxygen. It is preferable that the resin layer 18 satisfies an oxygen permeability of 10 cc/($m^2$·day·atm) or less at the shortest distance between the adjacent quantum dot-containing portions with the wall portion forming the concave portion 18*a* interposed therebetween. The oxygen permeability of the resin layer 18 at the shortest distance between the adjacent quantum dot-containing portions is preferably 10 cc/($m^2$·day·atm) or less, more preferably 1 cc/($m^2$·day·atm) or less, and still more preferably $1\times10^{-1}$ cc/($m^2$·day·atm) or less.

The desired shortest distance between the quantum dot-containing portions, that is, the desired distance t between the quantum dot-containing portions (concave portions 18*a*) varies depending on the composition of the resin layer 18. The shortest distance between the adjacent quantum dot-containing portions of the resin layer 18 means the shortest distance in the film surface between the adjacent quantum dot-containing portions in a case of observing from the main surface of the wavelength conversion member.

The elastic modulus of the resin layer 18 is preferably 0.5 to 10 GPa, more preferably 1 to 7 GPa, and still more preferably 3 to 6 GPa. It is preferable to set the elastic modulus of the resin layer within the above range in order to prevent defects during the formation of the resin layer while maintaining the desired oxygen permeability. The elastic modulus of the resin layer is measured by a method exemplified by Japanese Industrial Standards (JIS) K 7161 or the like.

For the composition for forming a resin layer (polymerizable composition), reference can be made to paragraphs [0174] to [0179] of WO2018/186300.

(Substrate Film)

As described above, the first substrate film 12 (and the second substrate film 14) can have a configuration in which the barrier layer 12*b* is laminated on the support film 12*a*. In addition, the barrier layer 12*b* (and the barrier layer 14*b*) can have the underlying organic layer 34, the inorganic layer 36, and the protective organic layer 38. Such a first substrate film 12 is laminated on the wavelength conversion layer 16 with the barrier layer 12*b* facing the wavelength conversion layer 16. In this configuration, the strength of the wavelength conversion member 10 can be improved by the support film 12*a*, and the film formation can be easily carried out. However, in the present invention and the present specification, the first substrate film (and the second substrate film) is not limited to such a configuration having the support film 12*a* and the barrier layer 12*b*, and various film-like materials (sheet-like materials) can be used as long as those materials can ensure the necessary impermeability to oxygen. For example, the first substrate film may be composed only of a support film having sufficient barrier properties. In addition, a first substrate film in which only one inorganic layer is formed on the surface of the support film can also be used.

The first substrate film 12 preferably has a total light transmittance of 80% or more and more preferably 85% or more in the visible light range. The visible light range is a wavelength range of 380 to 780 nm, and the total light transmittance indicates an arithmetic average of the light transmittance over the visible light range.

The oxygen permeability of the first substrate film 12 is preferably 1 cc/($m^2$·day·atm) or less. The oxygen permeability of the first substrate film 12 is more preferably 0.1 cc/($m^2$·day·atm) or less, still more preferably 0.01 cc/($m^2$·day·atm) or less, and even still more preferably 0.001 cc/($m^2$·day·atm) or less.

The first substrate film 12 preferably has water vapor barrier properties that block water (water vapor) in addition to gas barrier properties that block oxygen. The moisture permeability (water vapor permeability) of the first substrate film 12 is preferably 0.10 g/($m^2$·day·atm) or less and more preferably 0.01 g/($m^2$·day·atm) or less.

(Support Film)

A strip-shaped support film having flexibility and being transparent to visible light is preferable as the support film 12*a* (and the support film 14*a*). Here, the phrase "transparent to visible light" refers to that the light transmittance in the visible light range is 80% or more and preferably 85% or more. The light transmittance used as a measure of transparency can be calculated by measuring the total light transmittance and the amount of scattered light using the method described in JIS K 7105, that is, an integrating sphere type light transmittance measuring device, and subtracting the diffuse transmittance from the total light transmittance. For the support film having flexibility, reference can be made to paragraphs [0046] to [0052] of JP2007-290369A and paragraphs [0040] to [0055] of JP2005-096108A.

Specific examples of the support film 12*a* include a polyethylene terephthalate (PET) film, a film consisting of a polymer having a cyclic olefin structure, and a polystyrene film.

The thickness of the support film 12*a* is preferably 10 to 500 more preferably 20 to 400 μm and still more preferably 30 to 300 μm from the viewpoint of improving the impact resistance of the wavelength conversion member. In a form in which the retroreflection of light is increased, such as in a case where the concentration of quantum dots contained in the wavelength conversion layer 16 is reduced and in a case where the thickness of the wavelength conversion layer 16 is reduced, it is more preferable that the absorbance of light having a wavelength of 450 nm is lower. From this point of view, the thickness of the support film 12*a* is preferably 40 μm or less and more preferably 25 μm or less.

(Barrier Layer)

The first substrate film 12 (and the second substrate film 14) has the barrier layer 12*b* on one surface of the support film 12*a*. As described above, various known barrier layers can be used as the barrier layer 12*b*. It is preferable to have at least one inorganic layer, and an organic/inorganic lamination type barrier layer having one or more combinations of an inorganic layer and an organic layer serving as an underlayer of the inorganic layer is more preferable. In the wavelength conversion member 10 of the illustrated example, the barrier layer 12*b* of the first substrate film has, as shown in the partially enlarged view A of FIG. 3, a configuration in which three layers of the underlying organic layer 34 formed on the surface of the support film 12*a*, the inorganic layer 36 formed on the underlying organic layer 34, and the protective organic layer 38 formed on the inorganic layer 36 are laminated. In the following description, in a case where it is not necessary to distinguish between the underlying organic layer 34 and the protective organic layer 38, both are collectively referred to as an "organic layer".

The inorganic layer 36 is a layer containing an inorganic material as a main component, and is preferably a layer in which the inorganic material occupies 50% by mass or more, further 80% by mass or more, particularly 90% by mass or more, and more preferably a layer formed only from the inorganic material.

The inorganic layer 36 is preferably a layer having gas barrier properties that block oxygen. Specifically, the oxygen permeability of the inorganic layer is preferably 1 cc/($m^2$·day·atm) or less. The inorganic layer also preferably has water vapor barrier properties that block water vapor.

The thickness of the inorganic layer 36 is preferably 1 to 500 nm, more preferably 5 to 300 nm, and still more preferably 10 to 150 nm. This is because, in a case where the thickness of the inorganic layer 36 is within the above range, reflection in the inorganic layer 36 can be suppressed while achieving favorable barrier properties, and a laminated film having a higher light transmittance can be provided.

The organic layer (underlying organic layer 34 and protective organic layer 38) is a layer containing an organic material as a main component, and is intended preferably refer to a layer in which the organic material occupies 50% by mass or more, further 80% by mass or more, particularly 90% by mass or more.

For the organic layer, reference can be made to paragraphs [0020] to [0042] of JP2007-290369A and paragraphs [0074] to [0105] of JP2005-096108A. In one form, the organic layer preferably contains a cardo polymer. This is because the adhesion between the organic layer and the adjacent layer, particularly the adhesion with the inorganic layer, becomes stronger and therefore further excellent gas barrier properties can be achieved. For details of the cardo polymer, reference can be made to paragraphs [0085] to [0095] of JP2005-096108A.

The thickness of the organic layer is preferably 0.05 to 10 μm and more preferably 0.5 to 10 μm. In a case where the organic layer is formed by a wet coating method, the thickness of the organic layer is preferably 0.5 to 10 μm and more preferably 1 to 5 On the other hand, in a case where the organic layer is formed by a dry coating method, the thickness of the organic layer is preferably 0.05 to 5 μm and more preferably 0.05 to 1 μm. In a case where the thickness of the organic layer formed by the wet coating method or the dry coating method is within the above range, the adhesion with the inorganic layer can be further strengthened.

For details of the inorganic layer, reference can also be made to paragraphs [0193] to of WO2018/186300. In addition, for other details of the inorganic layer and the organic layer, reference can be made to the description of JP2007-290369A, JP2005-096108A, and further US2012/0113672A1.

In the wavelength conversion member, the organic layer may be laminated as an underlayer of the inorganic layer between the support film and the inorganic layer, or may be laminated as a protective layer of the inorganic layer between the inorganic layer and the wavelength conversion layer. In addition, in a case where two or more inorganic layers are provided, the organic layer may be laminated between the inorganic layers.

The first substrate film 12 (and the second substrate film 14) may be provided with a concavity-convexity imparting layer that imparts a concave-convex structure, on a surface opposite to the surface on the wavelength conversion layer 16 side. It is preferable that the first substrate film 12 has the concavity-convexity imparting layer because it is possible to improve the blocking properties and/or sliding properties of the substrate film. The concavity-convexity imparting layer is preferably a layer containing particles. Examples of the particles include inorganic particles such as silica, alumina and metal oxide, and organic particles such as crosslinked polymer particles. In addition, the concavity-convexity imparting layer is preferably provided on the surface of the substrate film opposite to the wavelength conversion layer, and may be provided on both surfaces of the substrate film.

The wavelength conversion member 10 can have a light scattering function in order to efficiently extract the fluorescence of the quantum dots to the outside. The light scattering function may be provided inside the wavelength conversion layer 16, or a layer having a light scattering function may be separately provided as a light scattering layer. The light scattering layer may be provided on the surface of the first substrate film 12 and/or the second substrate film 14 on the wavelength conversion layer 16 side, or may be provided on the surface of the first substrate film 12 and/or the second substrate film 14 opposite to the wavelength conversion layer 16. In a case where the concavity-convexity imparting layer is provided, it is preferable that the concavity-convexity imparting layer is a layer that can also be used as the light scattering layer.

(Mixed Layer and Impermeable Layer)

As described above, the mixed layer 28 contains the quantum dots 24 contained in the quantum dot-containing portion 20. In addition, the impermeable layer 30 can be a layer consisting of an oxygen-impermeable material and not containing the quantum dots 24. Various materials that can be used as the material for forming the resin layer 18 can be used as the oxygen-impermeable material. Above all, the mixed layer 28 and the impermeable layer 30 preferably contain the same polymerizable compound as the polymerizable compound used for forming the resin layer 18 as the oxygen-impermeable material.

(Manufacturing Method of Wavelength Conversion Member)

Next, an example of the manufacturing process of the wavelength conversion member will be described with reference to the conceptual diagrams of FIG. 11 and FIG. 12.

First, a composition L1 for forming a resin layer for forming the resin layer 18 is prepared by mixing various components such as a polymerization initiator, inorganic particles, and light scattering particles, if necessary, in addition to the polymerizable compound.

In addition, the above-mentioned polymerizable composition L2 containing quantum dots is prepared.

Further, a mold M having a concave-convex pattern corresponding to the concave portion 18*a* and the wall portion of the resin layer 18 for forming the resin layer 18, and the first substrate film 12 and the second substrate film 14 are prepared.

Figure 11:
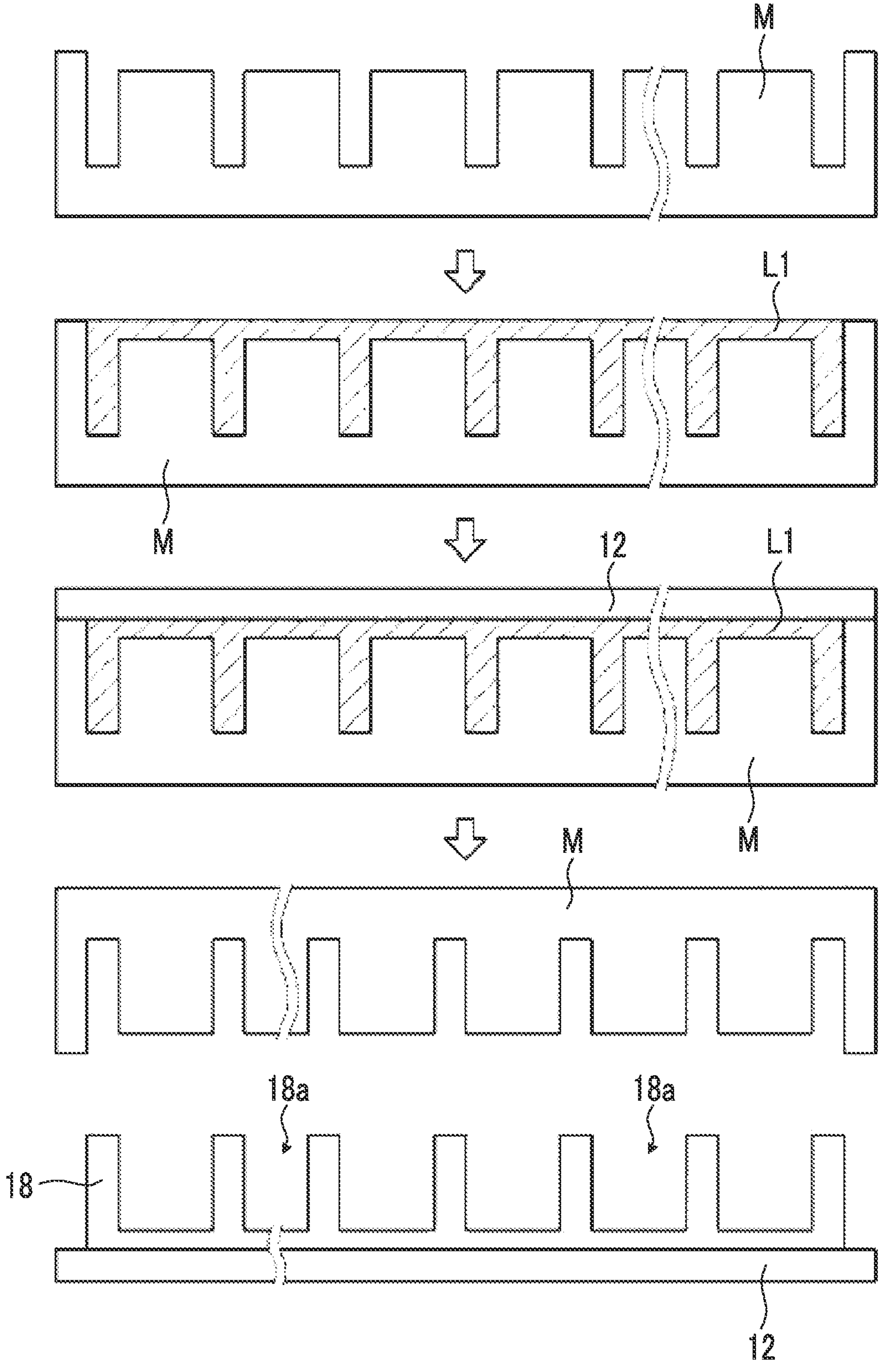
FIG. 11 is a conceptual diagram for illustrating an example of a method for manufacturing the wavelength conversion member.

After preparing these, first, as shown in the first and second stages of FIG. 11, the prepared mold M is filled with the prepared composition L1 for forming a resin layer, and as shown in the third stage of FIG. 11, the first substrate film 12 is laminated on the mold M to cover the entire surface of the composition L1 for forming a resin layer.

Next, the composition L1 for forming a resin layer is cured by, for example, irradiation with ultraviolet rays to form the resin layer 18, and as shown in the fourth stage of FIG. 11, the mold M is removed from the resin layer 18. As a result, a laminate is formed in which the resin layer 18 with the bottom of the concave portion 18*a* facing the first substrate film 12 is laminated on one surface of the first substrate film 12.

Figure 12:
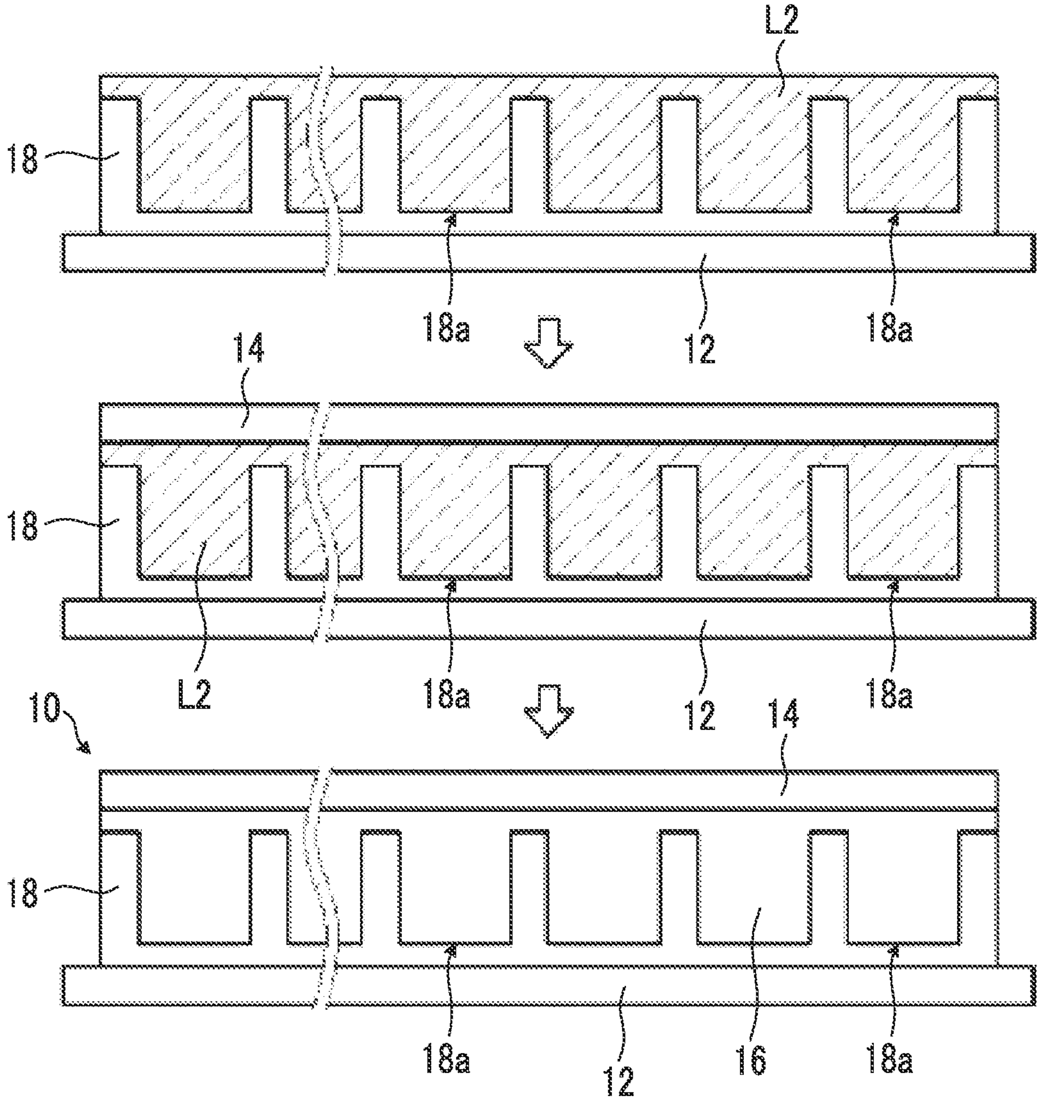
FIG. 12 is a conceptual diagram for illustrating an example of the method for manufacturing the wavelength conversion member.

After forming the laminate of the first substrate film 12 and the resin layer 18, the concave portion 18*a* is filled with the above-mentioned polymerizable composition L2 containing quantum dots (quantum dot-containing polymerizable composition), as shown in the first stage of FIG. 12. At this time, utilizing the surface tension and viscosity of the polymerizable composition L2, the concave portion 18*a* is filled with the quantum dot-containing polymerizable composition L2 so that the quantum dot-containing polymerizable composition L2 rises above the upper end of the wall portion of the resin layer 18.

Next, as shown in the second stage of FIG. 12, the second substrate film 14 is laminated to cover and seal the entire surface of the quantum dot-containing polymerizable composition L2. By adjusting the pressing force of the second substrate film 14 at this time, the gap between the upper end of the wall portion of the resin layer 18 and the second substrate film 14 can be adjusted. For example, in a case where the second substrate film 14 is laminated with a laminator, the gap between the upper end of the wall portion of the resin layer 18 and the second substrate film 14 can be adjusted by adjusting the pressure of the laminator.

Then, the quantum dot-containing polymerizable composition L2 is cured by, for example, irradiation with light to form a quantum dot-containing portion, and as shown in the third stage of FIG. 12, the wavelength conversion member 10 is produced in which the wavelength conversion layer 16 having the quantum dot-containing portions and the resin layer 18 is sandwiched between the first substrate film 12 and the second substrate film 14.

Figure 7:
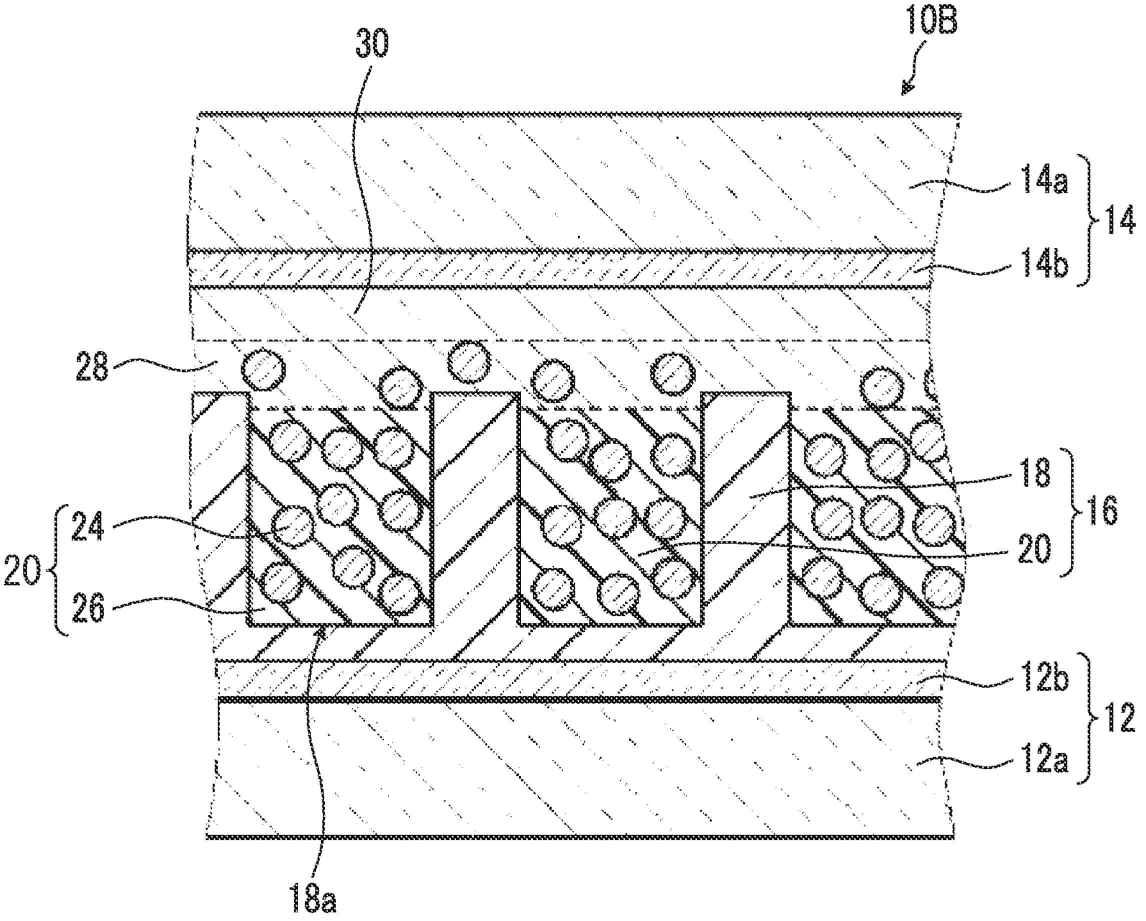
FIG. 7 is a cross-sectional view conceptually showing another example of the wavelength conversion member.
Figure 13:
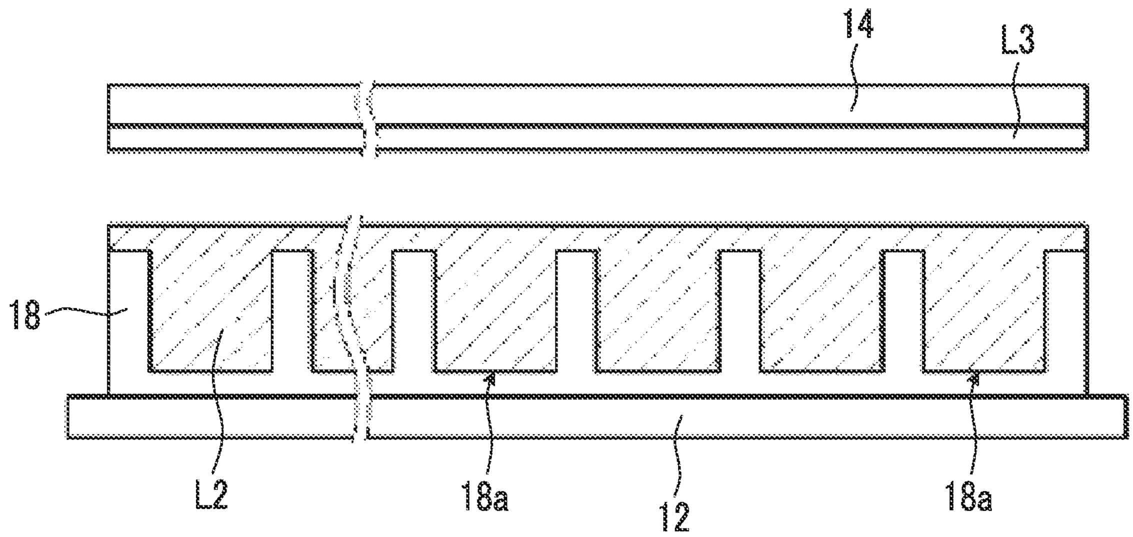
FIG. 13 is a conceptual diagram for illustrating another example of the method for manufacturing the wavelength conversion member.

In a case where the mixed layer 28 or the impermeable layer 30 is formed as in the wavelength conversion member 10A shown in FIG. 6 and the wavelength conversion member 10B shown in FIG. 7, a coating liquid L3 containing an oxygen-impermeable material is applied onto one surface of the second substrate film 14, as conceptually shown in FIG. 13, prior to lamination of the second substrate film 14 shown in the second stage of FIG. 12.

Then, with the coated surface of the coating liquid L3 facing the quantum dot-containing polymerizable composition L2 and as shown in the second stage of FIG. 12, the second substrate film 14 is laminated to cover and seal the entire surface of the quantum dot-containing polymerizable composition L2. As a result, the quantum dot-containing polymerizable composition L2 and the coating liquid L3 containing an oxygen-impermeable material are mixed.

Then, a wavelength conversion member having the mixed layer 28 or the impermeable layer 30 together with the quantum dot-containing portion can be manufactured by curing the quantum dot-containing polymerizable composition L2 and the coating liquid L3 containing an oxygen-impermeable material.

At this time, as described above, by adjusting the coating thickness of the coating liquid L3 containing an oxygen-impermeable material to the second substrate film 14, it is possible to set whether only the mixed layer 28 is formed or both the mixed layer 28 and the impermeable layer 30 are formed. Specifically, in a case where the coating thickness of the coating liquid L3 containing an oxygen-impermeable material to the second substrate film 14 is thin, only the mixed layer 28 can be formed, and in a case where the coating thickness of the coating liquid L3 containing an oxygen-impermeable material to the second substrate film 14 is thick, both the mixed layer 28 and the impermeable layer 30 can be formed. In addition, the thicker the coating thickness of the coating liquid L3, the thicker the impermeable layer 30 becomes.

In the wavelength conversion layer, the method for forming the concave portion 18*a* of the resin layer 18 is not limited to the method shown in FIG. 11, and various known methods for forming a sheet-like material having concavities and convexities can be used. For example, there is a method in which the composition L1 for forming a resin layer is first applied to the first substrate film 12, the mold M is pressed against the composition L1 for forming a resin layer, and then the composition L1 for forming a resin layer is cured, or a method in which the first substrate film 12 and the mold M are laminated, the composition L1 for forming a resin layer is filled between the first substrate film 12 and the mold M, and then the composition L1 for forming a resin layer is cured. In addition to these methods, a method of forming a planar resin layer and then etching the resin layer to form the resin layer 18 having the concave portion 18*a*, a method of forming the resin layer 18 having the concave portion 18*a* using a printing method such as an ink jet method or a dispenser method, and the like can also be used.

[Backlight Unit]

One aspect of the present invention relates to a backlight unit including the wavelength conversion member and a light source.

Figure 14:
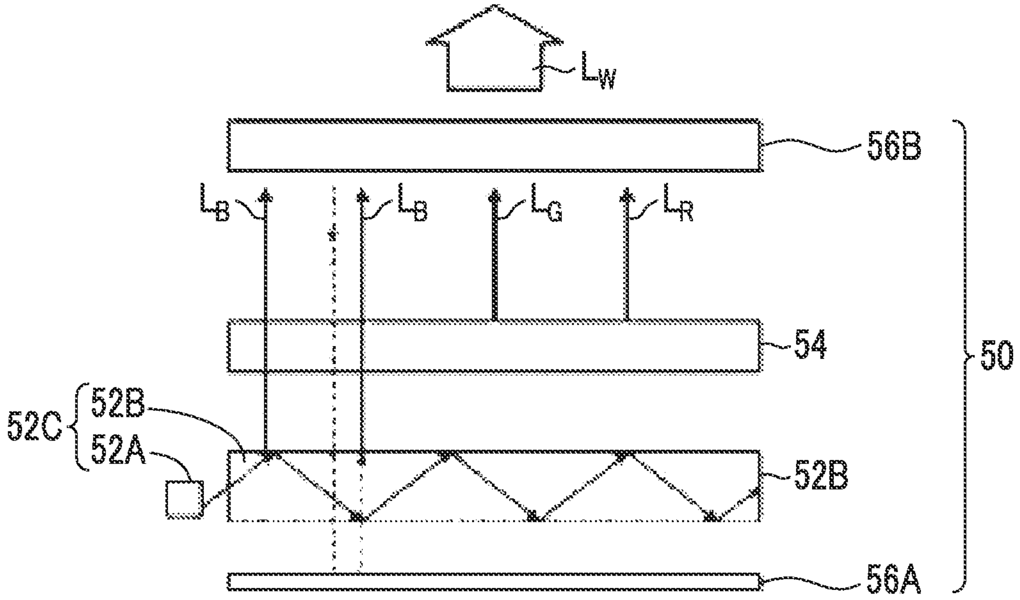
FIG. 14 is a diagram conceptually showing a configuration of an example of a backlight unit.

Hereinafter, an example of the backlight unit will be described with reference to the accompanying drawings. FIG. 14 is a schematic diagram showing a schematic configuration of the backlight unit.

As shown in FIG. 14, a backlight unit 50 includes a planar light source 52C consisting of a light source 52A that emits primary light (blue light $L_B$) and a light guide plate 52B that guides and emits the primary light emitted from the light source 52A, a wavelength conversion member 54 arranged on the planar light source 52C, a reflecting plate 56A arranged opposite to the wavelength conversion member 54 with the planar light source 52C interposed therebetween, and a retroreflective member 56B. In FIG. 14, the reflecting plate 56A, the light guide plate 52B, the wavelength conversion member 54, and the retroreflective member 56B are spaced apart from one another, but in reality these members may be formed in intimate attachment with one another.

The wavelength conversion member 54 emits fluorescence by using at least a part of primary light $L_B$ emitted from the planar light source 52C as excitation light and emits secondary light (green light $L_G$ and red light $L_R$) consisting of the fluorescence and primary light $L_B$ passed through the wavelength conversion member 54. For example, the wavelength conversion member 54 is a wavelength conversion member 10 which is configured such that a wavelength conversion layer 16 containing the quantum dots that emit the green light $L_G$ and the quantum dots that emit the red light $L_R$ upon irradiation with the blue light $L_B$ is sandwiched between a first substrate film 12 and a second substrate film 14.

In FIG. 14, $L_B$, $L_G$, and $L_R$ emitted from the wavelength conversion member 54 are incident on the retroreflective member 56B, and each incident light repeats reflection between the retroreflective member 56B and the reflecting plate 56A and can pass through the wavelength conversion member 54 many times. As a result, in the wavelength conversion member 54, a sufficient amount of excitation light (blue light $L_B$) is absorbed by quantum dots 24 in the wavelength conversion layer 16 and a sufficient amount of fluorescence ($L_G$ and $L_R$) is emitted, and white light $L_W$ is realized from the retroreflective member 56B and is emitted.

From the viewpoint of realizing high brightness and high color reproducibility, it is preferable to use a backlight unit having a multi-wavelength light source as the backlight unit 50. For example, preferred is a backlight unit which emits blue light having a light emission center wavelength in the wavelength range of 430 to 480 nm and having a luminescence intensity peak with a half-width of 100 nm or less, green light having a light emission center wavelength in the wavelength range of 500 to 600 nm and having a luminescence intensity peak with a half-width of 100 nm or less, and red light having a light emission center wavelength in the wavelength range of 600 to 680 nm and having a luminescence intensity peak with a half-width of 100 nm or less.

From the viewpoint of further improving brightness and color reproducibility, the wavelength range of the blue light emitted from the backlight unit 50 is more preferably 440 to 460 nm.

From the same viewpoint, the wavelength range of the green light emitted from the backlight unit 50 is preferably 520 to 560 nm and more preferably 520 to 545 nm.

In addition, from the same viewpoint, the wavelength range of the red light emitted from the backlight unit 50 is more preferably 610 to 640 nm.

In addition, from the same viewpoint, all the half-widths of the respective luminescence intensities of the blue light, the green light, and the red light emitted from the backlight unit 50 are preferably 80 nm or less, more preferably 50 nm or less, still more preferably 40 nm or less, and particularly preferably 30 nm or less. Above all, the half-width of the luminescence intensity of the blue light is particularly preferably 25 nm or less.

The light source 52A can be, for example, a blue light emitting diode that emits blue light having a light emission center wavelength in a wavelength range of 430 to 480 nm. Alternatively, an ultraviolet light emitting diode that emits ultraviolet light may be used. As the light source 52A, a laser light source or the like may be used in addition to light emitting diodes. In a case where a light source that emits ultraviolet light is provided, the wavelength conversion layer 16 of the wavelength conversion member 54 may contain quantum dots that emit blue light, quantum dots that emit green light, and quantum dots that emit red light, upon irradiation with ultraviolet light.

As shown in FIG. 14, the planar light source 52C may be a planar light source consisting of the light source 52A and the light guide plate 52B that guides and emits the primary light emitted from the light source 52A, or may be a planar light source in which the light source 52A and the wavelength conversion member 54 are arranged parallel to each other on the plane, and a diffusion plate is provided in place of the light guide plate 52B. The former planar light source is generally referred to as an edge light mode, and the latter planar light source is generally referred to as a direct backlight mode. In the above description, a case where a planar light source is used as the light source has been described as an example. In this regard, a light source other than the planar light source can also be used as the light source.

<Configuration of Backlight Unit>

In FIG. 14, an edge light mode backlight unit including a light guide plate, a reflecting plate, and the like as constituent members has been illustrated as the configuration of the backlight unit. In this regard, the configuration of the backlight unit may be a direct backlight mode. A known light guide plate can be used as the light guide plate.

In addition, the reflecting plate 56A is not particularly limited and a known reflecting plate can be used, for which reference can be made to JP3416302B, JP3363565B, JP4091978B, JP3448626B, and the like.

The retroreflective member 56B may be composed of a known diffusion plate, diffusion sheet, prism sheet (for example, BEF series manufactured by Sumitomo 3M Limited), light guide, or the like. For the configuration of the retroreflective member 56B, reference can be made to JP3416302B, JP3363565B, JP4091978B, JP3448626B, and the like.

[Liquid Crystal Display Device]

One aspect of the present invention relates to a liquid crystal display device including the backlight unit and a liquid crystal cell.

Figure 15:
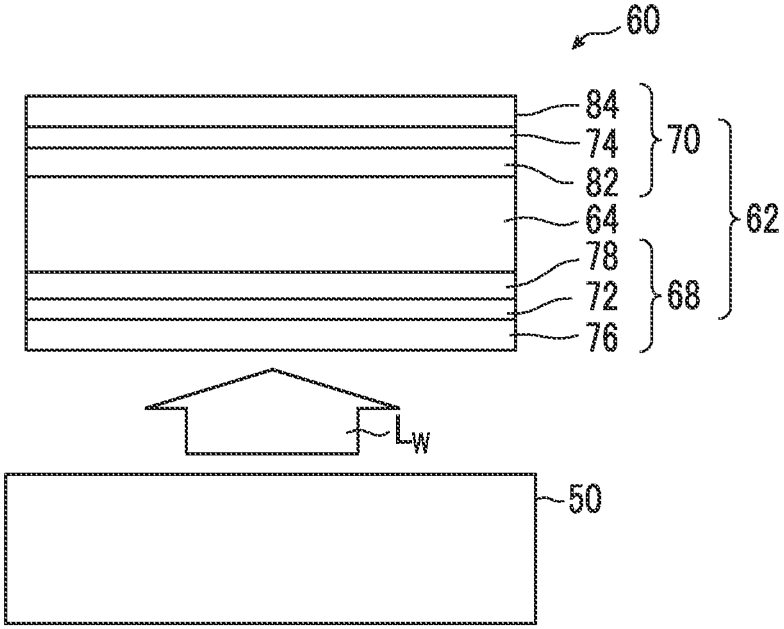
FIG. 15 is a diagram conceptually showing a configuration of an example of a liquid crystal display device.

Hereinafter, an example of the liquid crystal display device will be described with reference to the accompanying drawings. FIG. 15 is a schematic diagram showing a schematic configuration of the liquid crystal display device.

As shown in FIG. 15, a liquid crystal display device 60 includes a backlight unit 50 and a liquid crystal cell unit 62 arranged opposite to the retroreflective member side of the backlight unit.

As shown in FIG. 15, the liquid crystal cell unit 62 has a configuration in which a liquid crystal cell 64 is sandwiched between a polarizing plate 68 and a polarizing plate 70, in which the polarizing plate 68 and the polarizing plate 70 are each configured such that both main surfaces of each of polarizers 72 and 74 are protected by polarizing plate protective films 76 and 78, and polarizing plate protective films 82 and 84, respectively.

The liquid crystal cell 64, polarizing plates 68 and 70, and constituent elements thereof constituting the liquid crystal display device 60 are not particularly limited, and products produced by a known method, commercially available products, and the like can be used. In addition, it is of course possible to provide a known interlayer such as an adhesive layer between the layers.

A driving mode of the liquid crystal cell 64 is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode can be used. The liquid crystal cell is preferably of VA mode, OCB mode, IPS mode, or TN mode. However, the driving mode of the liquid crystal cell is not limited thereto. An example of the configuration of the liquid crystal display device in the VA mode may be the configuration illustrated in FIG. 2 of JP2008-262161A. In this regard, a specific configuration of the liquid crystal display device is not particularly limited, and a known configuration can be adopted.

The liquid crystal display device 60 can further have an optical compensation member for carrying out optical compensation, or an accompanying functional layer such as an adhesive layer, if necessary. In addition, in the liquid crystal display device 60, a surface layer such as a forward scattering layer, a primer layer, an antistatic layer, or an undercoat layer may be arranged together with (or in place of) a color filter substrate, a thin layer transistor substrate, a lens film, a diffusion sheet, a hard coat layer, an antireflection layer, a low reflective layer, an antiglare layer, and the like.

The polarizing plate 68 on the backlight unit 50 side may have a phase difference film as the polarizing plate protective film 78 on the liquid crystal cell 64 side. A known cellulose acylate film or the like can be used as such a phase difference film.

EXAMPLES

Hereinafter, the present invention will be described in more detail based on Examples. The materials, the amounts of materials used, the proportions, the treatment details, the treatment procedure, and the like shown in the Examples below may be appropriately modified without departing from the spirit of the present invention. Therefore, the scope of the present invention should not be construed as being limited by the specific examples described below. Unless otherwise specified, "%" described hereinafter indicates "% by mass".

Example 1

<Production of Wavelength Conversion Member>

(Production of Barrier Film)

As the first substrate film and the second substrate film, a barrier film in which an inorganic layer and an organic layer were formed on a support film consisting of polyethylene terephthalate (PET) was produced as follows.

A PET film (COSMOSHINE A4300, manufactured by Toyobo Co., Ltd., thickness: 23 μm) was used as the support film, and an organic layer and an inorganic layer were sequentially formed on one side of the support film by the following procedure.

Formation of Underlying Organic Layer

Trimethylolpropane triacrylate (TMPTA, manufactured by Daicel-Allnex Ltd.) and a photopolymerization initiator (ESACURE KT046, manufactured by Lamberti S.p.A.) were prepared, weighed to have a mass ratio of 95:5, and dissolved in methyl ethyl ketone to prepare a coating liquid having a concentration of solid contents of 15% for forming an underlying organic layer.

This coating liquid was applied onto the support film (PET film) by roll-to-roll using a die coater, followed by passing through a drying zone at a temperature of 50° C. for 3 minutes. Then, the coating liquid was cured by irradiation with ultraviolet rays (integrated irradiation amount of about 600 $mJ/cm^2$) in a nitrogen atmosphere, and the film was wound up. The thickness of the organic layer formed on the support film was 1

Formation of Inorganic Layer

Next, a silicon nitride film was formed as an inorganic layer on the surface of the underlying organic layer by using a chemical vapor deposition (CVD) apparatus for forming a film by roll-to-roll.

Silane gas (flow rate: 160 standard cubic centimeter per minute (sccm)), ammonia gas (flow rate: 370 sccm), hydrogen gas (flow rate: 590 sccm), and nitrogen gas (flow rate: 240 sccm) were used as source gases. A high frequency power source having a frequency of 13.56 MHz was used as a power source. The film forming pressure was 40 Pa(Pascal), and the ultimate film thickness was 50 nm.

Formation of Protective Organic Layer

Further, a protective organic layer was laminated on the surface of the inorganic layer. 5.0 parts by mass of a photopolymerization initiator (IRGACURE 184, manufactured by BASF SE) was weighed with respect to 95.0 parts by mass of a urethane skeleton acrylate polymer (ACRIT 8BR930, manufactured by Taisei Fine Chemical Co., Ltd.), and these were dissolved in methyl ethyl ketone to prepare a coating liquid having a concentration of solid contents of 15% for forming a protective organic layer.

This coating liquid was applied directly onto the surface of the inorganic layer by roll-to-roll using a die coater, followed by passing through a drying zone at a temperature of 100° C. for 3 minutes. Then, while being wound around a heat roll heated to a surface temperature of 60° C. and transported, the coating liquid was cured by irradiation with ultraviolet rays (integrated irradiation amount of about 600 $mJ/cm^2$) and the film was wound up. The thickness of the protective organic layer formed on the support film was 0.1 μm.

In this manner, a barrier film with a protective organic layer was produced as the first substrate film and the second substrate film.

In a case where the oxygen permeability of this barrier film was measured using OX-TRAN 2/20 (manufactured by MOCON, Inc.) under the conditions of a measurement temperature of 23° C. and a relative humidity of 90%, the oxygen permeability was $4.0\times10^{-3}$ cc/($m^2$·day·atm) or less.

(Formation of Resin Layer)

Preparation of Composition for Forming Resin Layer

A composition for forming a resin layer was prepared by putting the following components into a tank and mixing them.

- Urethane (meth)acrylate (U-4HA, manufactured by Shin-Nakamura Chemical Co., Ltd.): 42 parts by mass
- Tricyclodecanedimethanol diacrylate (A-DCP, manufactured by Shin-Nakamura Chemical Co., Ltd.): 42 parts by mass Flat alumina (inorganic layered compound: SERAPH 05070, manufactured by Kinsei Matec Co., Ltd.): 15 parts by mass Photopolymerization initiator (IRGACURE TPO, manufactured by BASF SE): 1 part by mass Formation of Resin Layer As a mold for forming the resin layer, a mold having a convex portion corresponding to the concave portion of the resin layer and a concave portion corresponding to the wall portion of the resin layer was prepared.

Here, the concave portion of the resin layer (convex portion of the mold) was of a regular hexagonal shape with a side of 125 μm and had a honeycomb pattern. The depth h of the concave portion (height of the convex portion of the mold) was 40 and the distance between the concave portions (distance between the convex portions of the mold (distance t between the quantum dot-containing portions, that is, the thickness of the wall portion)) was 50 μm (See FIG. 5). In the concave portion of the mold M which serves as the wall portion, a corner portion of the bottom was made to have a curved surface having a curvature radius of 10 μm.

The composition for forming a resin layer prepared above was filled to completely fill the concave portions of the mold. Next, the first substrate film (barrier film) was laminated on the mold to completely cover the composition for forming a resin layer, and the composition for forming a resin layer was photocured in a state of being in pressure contact at a pressure of 0.5 MPa with a laminator. The photocuring of the composition for forming a resin layer was carried out by irradiation with ultraviolet rays at a dose of 500 mJ/$cm^2$ from the first substrate film side using a 200 W/cm air-cooling metal halide lamp (manufactured by Eye Graphics Co., Ltd.). Then, the mold was removed to produce a laminate in which the resin layer was laminated on the first substrate film (see FIG. 11).

Using the composition for forming a resin layer, a film having a thickness of 50 μm was formed under exactly the same conditions. That is, this film corresponds to a wall portion having a thickness of 50 μm in the resin layer. As a result of measuring the oxygen permeability of this film in the same manner as before, the oxygen permeability was 8 cc/($m^2$·day·atm). In addition, as a result of measuring the elastic modulus of the resin layer after curing in accordance with JIS K 7161, the elastic modulus was 4.2 GPa.

(Production of Wavelength Conversion Member)

Preparation of Quantum Dot-Containing Polymerizable Composition

The quantum dot-containing polymerizable composition was prepared by putting the following components into a tank and mixing them. In the preparation, the toluene dispersion liquid of quantum dots 1 (emission maximum: 520 nm) and the toluene dispersion liquid of quantum dots 2 (emission maximum: 630 nm) were mixed and used in such an amount that the total content of quantum dots in the polymerizable composition was 2.0%.

Quantum dots 1 and 2 are the following semiconductor nanoparticles having a core-shell structure (core: InP/shell: ZnS).

Quantum dots 1: INP530-10 (manufactured by NN-Labs, LLC)

Quantum dots 2: INP620-10 (manufactured by NN-Labs, LLC)

Toluene Dispersion Liquid of Quantum Dots: 2.0% in Terms of Quantum Dots

Component A (tricyclodecanedimethanol diacrylate (NK Ester A-DCP, manufactured by Shin-Nakamura Chemical Co., Ltd.): Refer to Table 1.

Component B (isobornyl acrylate (IBXA, manufactured by Osaka Organic Chemical Industry Ltd.): Refer to Table 1.

Component C (trimethylolpropane tris(3-mercaptopropionate) (TMMP, manufactured by SC Organic Chemical Co., Ltd.): 18.5%

Component D (β-carboxyethyl acrylate (β-CEA, manufactured by Daicel-Allnex Ltd.): 4.63%

Component E (Type: Refer to Table 1): Refer to Table 1.

Light scattering particles (ADVANCED ALUMINA AA-1.5, manufactured by Sumitomo Chemical Co., Ltd.): 7.5%

Photopolymerization initiator (IRGACURE TPO, manufactured by BASF SE): 0.107%

The component A is a first (meth)acrylate (polyfunctional (meth)acrylate), the component B is a monofunctional (meth)acrylate, the component C is a polyfunctional thiol, the component D is a second (meth)acrylate, and the component E used in Example 1 and Examples described later is a phenolic compound.

Production of Wavelength Conversion Member

The quantum dot-containing polymerizable composition was filled in the concave portions of the resin layer to completely fill the concave portions of the resin layer of the laminate of the first substrate film and the resin layer produced above. Next, the second substrate film (barrier film) was laminated on the resin layer to completely cover the quantum dot-containing polymerizable composition, and the quantum dot-containing polymerizable composition was photocured, in a state of being in pressure contact at a pressure of 0.3 MPa with a laminator, to form a wavelength conversion layer in which quantum dot-containing portions (cured product obtained by curing the quantum dot-containing polymerizable composition) were formed in the concave portions discretely formed in the resin layer, thus producing a wavelength conversion member (see FIG. 12). The photocuring of the quantum dot-containing polymerizable composition was carried out by irradiation with ultraviolet rays at a dose of 500 mJ/$cm^2$ from the first substrate film side using a 200 W/cm air-cooling metal halide lamp (manufactured by Eye Graphics Co., Ltd.).

The produced wavelength conversion member was cut with a microtome, and the cross section of the section was observed with SEM. As a result, this wavelength conversion member had a gap of 0.5 μm between the upper end of the wall portion of the resin layer and the second substrate film. In addition, the cross section was irradiated with excitation light having a wavelength of 405 nm, and the distribution of luminescent particles in the cross section was observed with a confocal laser microscope (TCS SP5, manufactured by Leica Camera AG) using an objective lens having a magnification of 50 times. As a result, it was confirmed for the wavelength conversion member that a layer having a thickness of 0.5 μm and containing quantum dots (a layer containing quantum dots) similar to the quantum dot-containing portion formed in the concave portion of the resin layer was formed between the upper end of the wall portion of the resin layer and the second substrate film.

Examples 2 to 8 and Comparative Examples 1 to 3

A wavelength conversion member was produced in the same manner as in Example 1, except that the types and/or contents of various components of the quantum dot-containing polymerizable composition were changed as shown in Table 1.

[Evaluation Method]

<Relative Brightness>

A commercially available tablet terminal (Kindle Fire HDX 7, manufactured by Amazon) equipped with a blue light source in a backlight unit was disassembled, and the backlight unit was taken out. Instead of Quantum Dot Enhancement Film (QDEF), the wavelength conversion film incorporated in the backlight unit, a wavelength conversion member of each of Examples or Comparative Examples cut out into a rectangle was incorporated into the backlight unit. In this manner, a liquid crystal display device was produced.

The produced liquid crystal display device was turned on so that the entire surface was displayed in white, and the brightness was measured by a brightness meter (SR3, manufactured by Topcon Corporation) installed at a position of 520 mm in a direction perpendicular to the surface of a light guide plate.

For each of Examples and Comparative Examples, the brightness (relative brightness) was obtained as a relative value with respect to the brightness of Comparative Example 1. Based on the relative brightness obtained in this manner, the brightness was evaluated according to the following evaluation standards. In a case where the evaluation result is A, B, or C, it can be said that the wavelength conversion member is capable of emitting light with high brightness.

A: Relative brightness≥102%

B: 101%≤relative brightness<102%

C: 100%≤relative brightness<101%

D: Relative brightness<100%

<Brightness after Durability>

Each wavelength conversion member of Examples and Comparative Examples was once taken out from the liquid crystal display device after the above-mentioned brightness evaluation. The taken-out wavelength conversion member was irradiated with light having a wavelength of 445 nm toward the surface on the second substrate film side in an environment having an atmospheric temperature of 50° C. for 1000 hours.

After incorporating the wavelength conversion member after the light irradiation into the liquid crystal display device again, the brightness was measured in the same manner as described above, and the brightness was obtained as a relative value with respect to the brightness of Comparative Example 1 before the light irradiation. For each wavelength conversion member of Examples and Comparative Examples, the "brightness after durability (unit: %)=(relative brightness after light irradiation/relative brightness before light irradiation)×100" was calculated. Based on the calculated value, the durability was evaluated according to the following evaluation standards. It can be said that, in a case where the evaluation result is A or B, the decrease in brightness is small and the durability is excellent, and it can be said that, in a case where the evaluation result is A, the durability is more excellent.

A: Brightness after durability≥96%

B: 94%≤brightness after durability<96%

<Liquid Stability>

The following viscosity measurement was carried out using a tuning fork vibration viscometer SV-10A (manufactured by A & D Company, Limited) as a viscometer in an environment having an atmospheric temperature of 25° C. and a relative humidity of 60%.

A part of the quantum dot-containing polymerizable composition prepared for producing each wavelength conversion member of Examples and Comparative Examples was collected and measured for viscosity (viscosity before storage).

After that, each quantum dot-containing polymerizable composition was stored for 2 weeks in an environment having an atmospheric temperature of 25° C. and a relative humidity of 60%, and then a viscosity (viscosity after storage) was measured.

The liquid stability was evaluated according to the following evaluation standards based on the change in viscosity calculated by "change in viscosity (unit: %)=(viscosity after storage/viscosity before storage)×100-100". In a case where the evaluation result is A, B, or C, it can be said that the liquid stability is excellent.

A: change in viscosity≤10%

B: 10%<change in viscosity≤30%

C: 30%<change in viscosity≤100%

D: 100%<change in viscosity≤300%

E: gelation

TABLE 1

| | | | Component E | | Evaluation result | | |
|---|---|---|---|---|---|---|---|
| | Component A | Component B | Product name | Amount added | Relative brightness | Brightness after durability | Liquid stability |
| Comparative Example 1 | 35.9% | 31.3% | — | — | Standards | A | E |
| Example 1 | 35.7% | 31.1% | MEHQ | 0.463% | C | A | C |
| Example 2 | 35.7% | 31.1% | BHT | 0.463% | C | A | C |
| Example 3 | 35.7% | 31.1% | TBC | 0.463% | B | A | B |
| Example 4 | 35.9% | 31.3% | Pyrogallol | 0.005% | B | A | B |
| Example 5 | 35.9% | 31.3% | Pyrogallol | 0.009% | A | A | A |
| Example 6 | 35.9% | 31.2% | Pyrogallol | 0.093% | A | A | A |
| Example 7 | 35.7% | 31.1% | Pyrogallol | 0.463% | A | B | A |
| Example 8 | 35.9% | 31.2% | Methyl gallate | 0.093% | A | A | A |
| Comparative Example 2 | 35.9% | 31.2% | TEMPO | 0.093% | D | A | D |
| Comparative Example 3 | 35.9% | 31.2% | DPPH | 0.093% | D | A | D |

(Note:
For component C and component D, refer to the foregoing description)

From the results shown in Table 1, it can be confirmed that the wavelength conversion member of each of Examples is capable of emitting light with high brightness, and the quantum dot-containing polymerizable composition used for producing the wavelength conversion member has excellent liquid stability.

Details of components of the product names shown in Table 1 are shown in Table 2, and the structures of the components are shown below.

TABLE 2

| Product name | Manufacturer | Compound name |
|---|---|---|
| MEHQ | TCI | 4-Methoxy-phenol |
| BHT | TCI | 2,6-Di-tert-butyl-p-cresol |
| TBC | TCI | 4-Tert-butylpyrocatechol |
| Pyrogallol | TCI | Pyrogallol |
| Methyl gallate | TCI | Methyl gallate |
| TEMPO | TCI | 2,2,6,6-Tetramethylpiperidine 1-oxyl free radical |
| DPPH | TCI | 1,1-Diphenyl-2-picrylhydrazyl free radical |

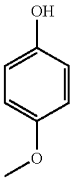

MEHQ

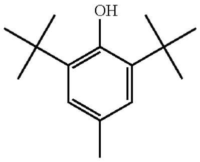

BHT

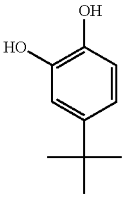

TBC

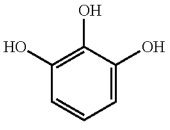

Pyrogallol

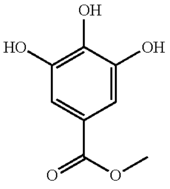

Methyl gallate

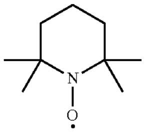

TEMPO

TABLE 2-continued

| Product name | Manufacturer | Compound name |
|---|---|---|

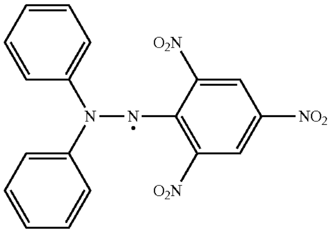

DPPH

One aspect of the present invention is useful in the technical field of a liquid crystal display device.

EXPLANATION OF REFERENCES

10, 10A, 10B: wavelength conversion member
12: first substrate film
12*a*, 14*a*: support film
12*b*, 14*b*: barrier layer
14: second substrate film
16: wavelength conversion layer
18: resin layer
18*a*: concave portion
20: quantum dot-containing portion
24, 24*e*: quantum dot
26: matrix
28: mixed layer
30: impermeable layer
34: underlying organic layer
36: inorganic layer
38: protective organic layer
50: backlight unit
52A: light source
52B: light guide plate
52C: planar light source
54: wavelength conversion member
56A: reflecting plate
56B: retroreflective member
60: liquid crystal display device
62: liquid crystal cell unit
64: liquid crystal cell
68, 70: polarizing plate
72, 74: polarizer
76, 78, 82, 84: polarizing plate protective film
L1: composition for forming resin layer
L2: quantum dot-containing polymerizable composition
L3: coating liquid containing oxygen-impermeable material
M: mold

What is claimed is:

1. A polymerizable composition comprising:
a quantum dot;
a polyfunctional thiol;
a polyfunctional (meth)acrylate; and
a phenolic compound represented by Formula 1, (Formula 1)

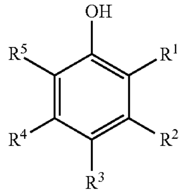

in Formula 1, among $R^1$ to $R^5$, one represents a hydroxy group and the others independently represent a hydrogen atom or a substituent other than a hydroxy group, or two represent hydroxy groups and the others independently represent a hydrogen atom or a substituent other than a hydroxy group;

wherein the hydroxy group is a group represented by —OH;

wherein the substituent other than the hydroxy group is a linear or branched alkyl groups having 1 to 6 carbon atoms, or a carboxy group which may be substituted with a linear or branched alkyl groups having 1 to 6 carbon atoms; and wherein the number of the substituent other than a hydroxy group contained in one molecule of the phenolic compound is zero or one.

2. The polymerizable composition according to claim 1, wherein the number of hydroxy groups contained in one molecule of the phenolic compound is 2.

3. The polymerizable composition according to claim 1, wherein the number of hydroxy groups contained in one molecule of the phenolic compound is 3.

4. The polymerizable composition according to claim 1, wherein the polymerizable composition contains pyrogallol as the phenolic compound.

5. The polymerizable composition according to claim 4, wherein a content of pyrogallol with respect to a total amount of the composition is 0.001% by mass or more and 0.500% by mass or less.

6. The polymerizable composition according to claim 4, wherein a content of pyrogallol with respect to a total amount of the composition is 0.005% by mass or more and 0.300% by mass or less.

7. The polymerizable composition according to claim 4, wherein a content of pyrogallol with respect to a total amount of the composition is 0.010% by mass or more and 0.100% by mass or less.

8. A cured product obtained by curing the polymerizable composition according to claim 1.

9. The cured product according to claim 8, wherein the polymerizable composition contains pyrogallol as the phenolic compound.

10. The cured product according to claim 9, wherein a content of pyrogallol in the polymerizable composition with respect to a total amount of the composition is 0.001% by mass or more and 0.500% by mass or less.

11. The cured product according to claim 9, wherein a content of pyrogallol in the polymerizable composition with respect to a total amount of the composition is 0.005% by mass or more and 0.300% by mass or less.

12. The cured product according to claim 9, wherein a content of pyrogallol in the polymerizable composition with respect to a total amount of the composition is 0.010% by mass or more and 0.100% by mass or less.

13. A wavelength conversion member comprising:

the cured product according to claim 8.

14. A backlight unit comprising:

the wavelength conversion member according to claim 13; and a light source.

15. A liquid crystal display device comprising:

the backlight unit according to claim 14; and a liquid crystal cell.

* * * * *